March 1, 1955 R. C. STILES 2,703,338

SEMIAUTOMATIC MESSAGE FORWARDING UNIT

Filed Oct. 22, 1953 15 Sheets-Sheet 1

INVENTOR.
RICHARD C. STILES

BY *Wm. Walter Owen*

ATTY.

INVENTOR.
RICHARD C. STILES
BY Wm. Walter Owen.
ATTY.

March 1, 1955 R. C. STILES 2,703,338

SEMIAUTOMATIC MESSAGE FORWARDING UNIT

Filed Oct. 22, 1953 15 Sheets-Sheet 3

INVENTOR.
RICHARD C. STILES

BY Wm. Walter Owen

ATTY.

March 1, 1955 R. C. STILES 2,703,338

SEMIAUTOMATIC MESSAGE FORWARDING UNIT

Filed Oct. 22, 1953 15 Sheets-Sheet 4

INVENTOR.
RICHARD C. STILES
BY Mc Walter Owen
ATTY.

INVENTOR.
RICHARD C. STILES
BY Wm. Walter Owen
ATTY.

INVENTOR.
RICHARD C. STILES
BY Mc Walter Owen
ATTY.

March 1, 1955 R. C. STILES 2,703,338

SEMIAUTOMATIC MESSAGE FORWARDING UNIT

Filed Oct. 22, 1953 15 Sheets-Sheet 7

INVENTOR.
RICHARD C. STILES
BY Wm. Walter Owen.
ATTY.

March 1, 1955 R. C. STILES 2,703,338

SEMIAUTOMATIC MESSAGE FORWARDING UNIT

Filed Oct. 22, 1953 15 Sheets-Sheet 8

INVENTOR.
RICHARD C. STILES
BY Wm. Walter Duren
ATTY.

INVENTOR.
RICHARD C. STILES
BY Mc Walter Owen
ATTY.

INVENTOR.
RICHARD C. STILES
BY

ATTY

March 1, 1955 R. C. STILES 2,703,338

SEMIAUTOMATIC MESSAGE FORWARDING UNIT

Filed Oct. 22, 1953 15 Sheets-Sheet 11

INVENTOR.
RICHARD C. STILES
BY Mc Walter Owen
ATTY.

CONTROL CKT. I OF
SEMI-AUTO MESSAGE
FORWARDING UNIT I

INVENTOR.
RICHARD C. STILES
BY Wm Walter Owen
ATTY.

INVENTOR.
RICHARD C. STILES
BY Wm. Walter Owen
ATTY.

*INVENTOR.*
RICHARD C. STILES
BY Wm Walter Owen
ATTY.

March 1, 1955 R. C. STILES 2,703,338

SEMIAUTOMATIC MESSAGE FORWARDING UNIT

Filed Oct. 22, 1953 15 Sheets-Sheet 15

INVENTOR.
RICHARD C. STILES
BY Wm. Walter Owen
ATTY.

United States Patent Office 2,703,338

Patented Mar. 1, 1955

2,703,338

SEMIAUTOMATIC MESSAGE FORWARDING UNIT

Richard C. Stiles, La Grange, Ill., assignor to Automatic Electric Laboratories, Inc., Chicago, Ill., a corporation of Delaware Application October 22, 1953, Serial No. 387,605

14 Claims. (Cl. 178—2)

This invention relates in general to telegraph communication systems and more particularly to a semi-automatic mechanism utilized in certain circumstances for connecting an associated signal transmitting device to a predetermined telegraph line and for thereafter controlling said device to send the signals of a telegraph message over said line toward a predetermined destination.

Although the preferred embodiment, disclosed herein, has been adapted for use in the automatic telegraph switching system disclosed in the copending application of Richard C. Stiles (the applicant herein), Serial No. 260,854, filed December 10, 1951, it will be understood that this invention may readily be utilized in other telegraph systems.

The "semi-automatic message forwarding unit" shown herein is utilized in the system disclosed in said copending application for sending messages which have not been received over an incoming line and automatically retransmitted by way of a cross office unit. Examples of some of the messages sent by the "semi-automatic message forwarding unit" are as follows:

1. Supervisory messages sent by attending personnel for traffic control, such as corrections, questions, etc.
2. Messages routed to the "intercept operator" position, for example when all cross office units are busy.
3. Reruns of messages taken from the monitor unit reels individually associated with outgoing lines.
4. Messages stored in a cross office unit in which trouble develops.

It is an object of this invention to provide a means for preparing a signal sending device and its associated control circuits for the transmission of a message or messages toward a predetermined destination.

It is an object of this invention to provide a means for preparing a signal sending device and its associated control circuits for the transmission of a message or messages toward a predetermined destination in a system wherein messages are automatically transmitted by a plurality of transmitting devices consecutively and preferentially in accordance with their respective orders of priority after said preparation.

A further object of this invention is to provide means whereby transmission instructions of a message or messages are manually set up, whereby said instructions are semi-automatically transferred to and registered in a control circuit associated with a signal sending device and whereby said control circuit after being started manually, is automatically controlled thereafter to cause said device to transmit said message or messages in accordance with said transmission instructions.

A further object of this invention is to provide a remote control system for setting-up control equipment, which equipment after being set up thereafter controls a sending device to transmit a telegraph message over a predetermined line.

A feature of this invention is the provision of means for giving an opeartor some degree of control over the order in which messages are transmitted over a predetermined line.

Another feature is the means whereby an operator can cause a semi-automatically forwarded message to be transmitted over a predetermined line either before or after messages stored in automatic and other semi-automatic message forwarding units awaiting transmission over said line.

Another feature is the arrangement for causing cooperation between fully automatic and semi-automatic telegraph message forwarding units for sending messages over various outgoing lines in order and for sending messages over the same line in accordance with a predetermined order of priority assigned to the messages.

Another feature is the use of common control equipment as well as individually associated equipment for preparing a plurality of semi-automatic message forwarding units for the transmission of messages stored therein.

Further features and objects will be evident upon a perusal of the following disclosure in which:

Figs. 14 and 15 show equipment associated with two outgoing lines; and

Figure 1:
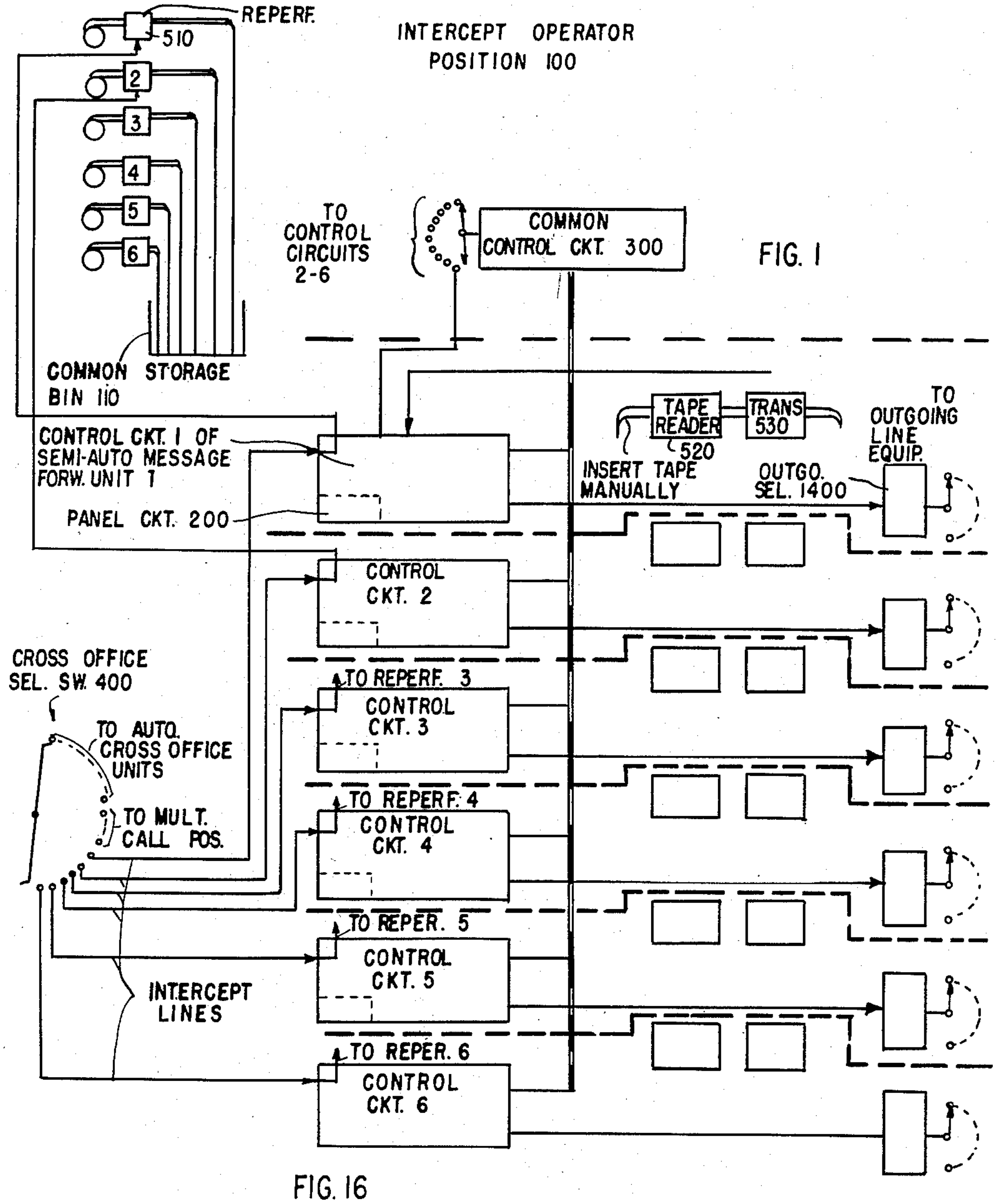
Fig. 1 shows in block diagram the semi-automatic message forwarding units and associated equipment at the intercept operator position.
Figure 16:
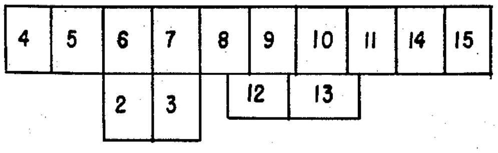
Fig. 16 shows the layout of the circuits shown in Figs. 2 to 15.

With particular reference to Fig. 1, it will be noted that the intercept operator position 100 (Fig. 1) corresponds to the intercept operator position 3330 of the above-mentioned copending application, that cross office selector switch 400 corresponds to cross office selector switch 3300 of the copending application, that the outgoing selector switch 1400 is similar to the outgoing selector switch 4300 of the copending application and that control circuit 1 (which is fully shown in Figs. 6–13 herein) is similar to the cross office unit control circuits shown in Figs. 35–42 of said copending application.

In Fig. 1, it will be seen that the cross office selector switch 400 has access to a plurality of automatic cross office units, to a multiple call position (both described in said copending application) and further has access to six intercept lines connected to the last six bank contacts and terminating respectively in six reperforators.

Said intercept operator position 100 has included therein, (1) The above-mentioned six intercept lines and reperforators, (2) A tape storage bin 110 common to all the reperforators, (3) Six semi-automatic message forwarding units each of which includes a control circuit such as control circuit 1 of the semi-automatic message forwarding unit 1, a panel circuit such as panel circuit 200, a tape reader such as tape reader 520, a transmitter such as transmitter 530 and one or more outgoing selector switches such as outgoing selector switch 1400.

(4) A control circuit 300 common to all of said forwarding units.

Figure 2:
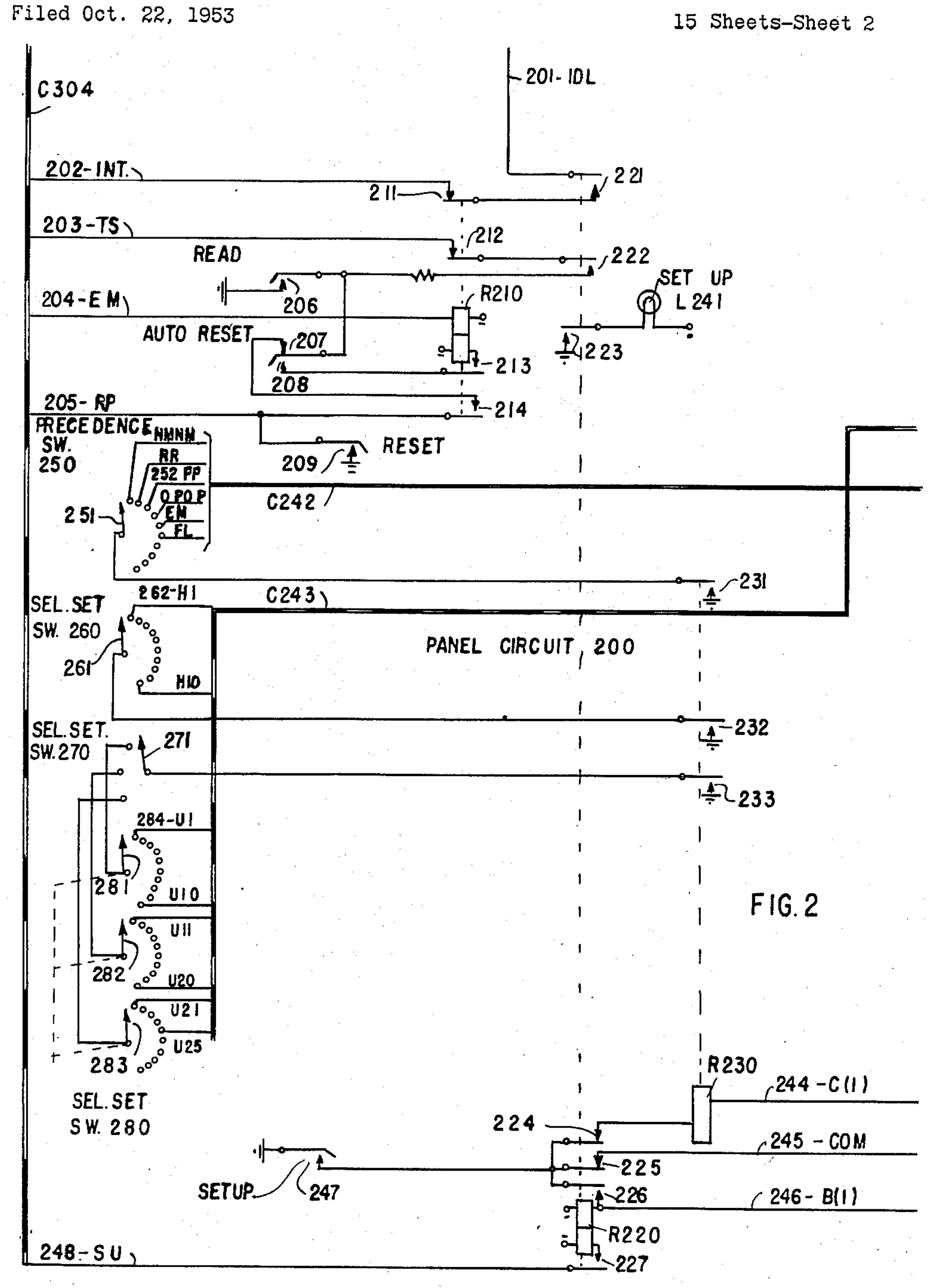
Fig. 2 shows a panel circuit in one of said units.
Figure 3:
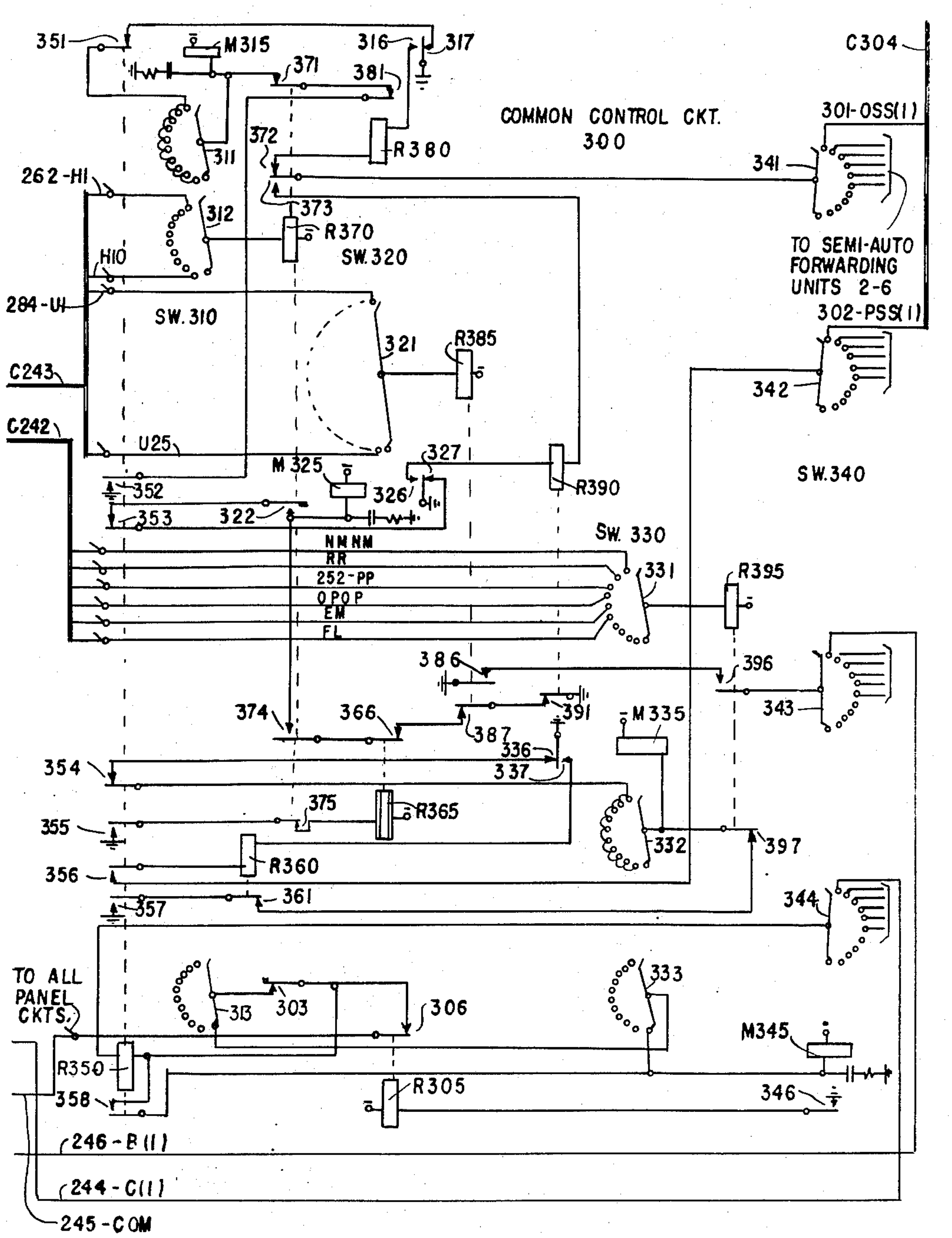
Fig. 3 shows the control circuit common to all of said units and having access to each.
Figure 4:
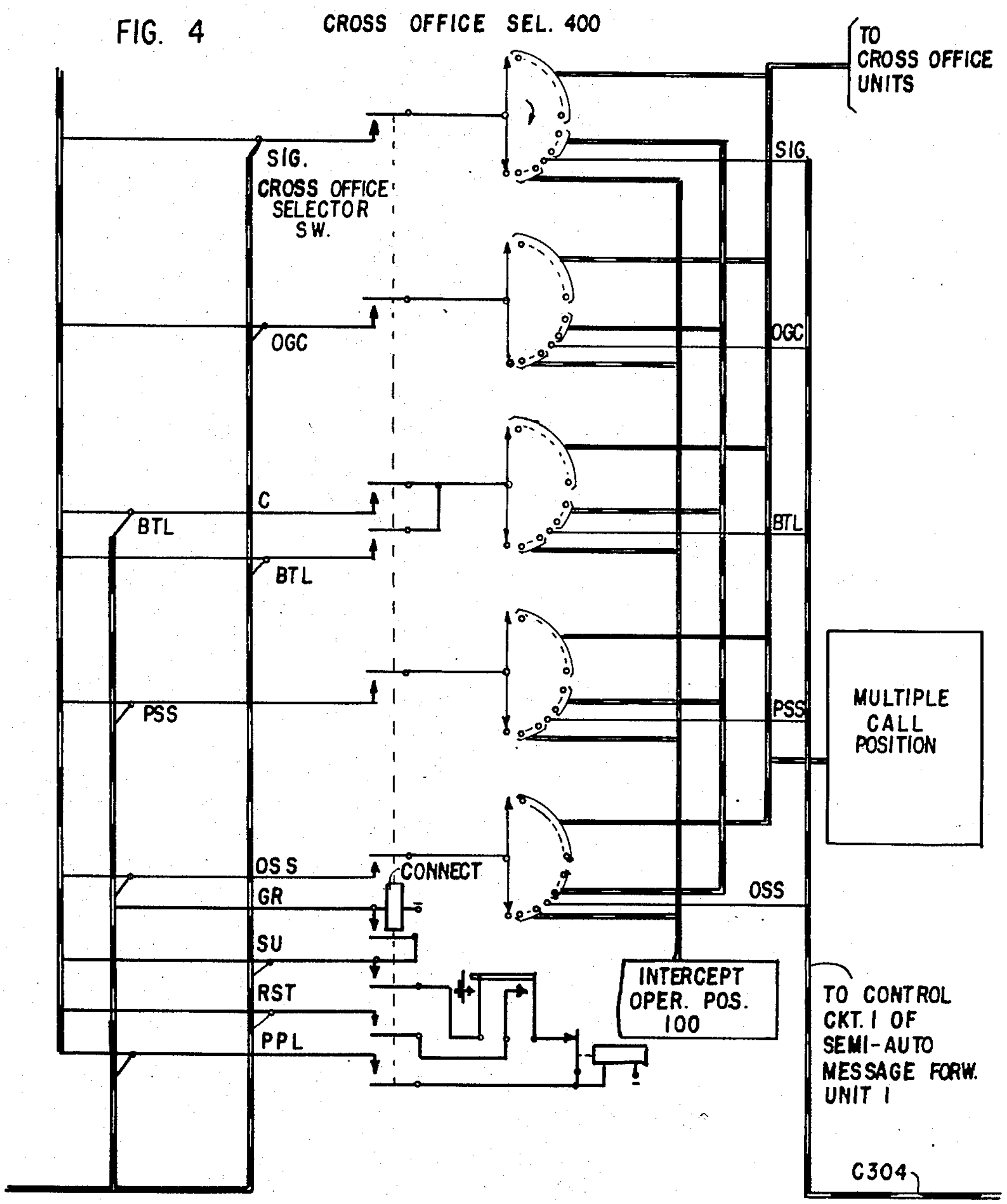
Fig. 4 shows a cross office selector switch.
Figure 5:
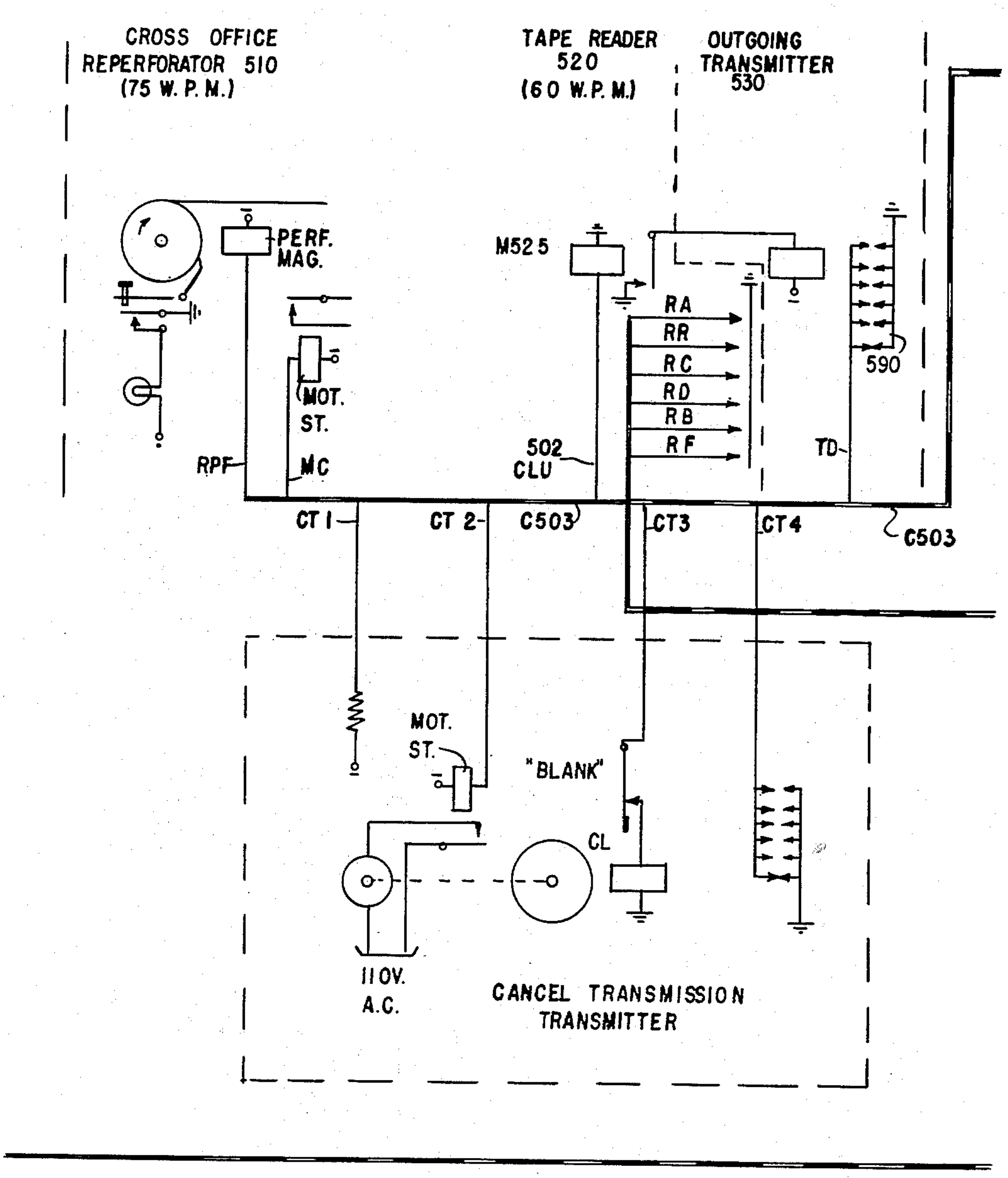
Fig. 5 shows the reperforator, tape reader and outgoing transmitter associated with the unit, with which said panel circuit is associated and a cancel transmission transmitter common to all units.
Figure 6:
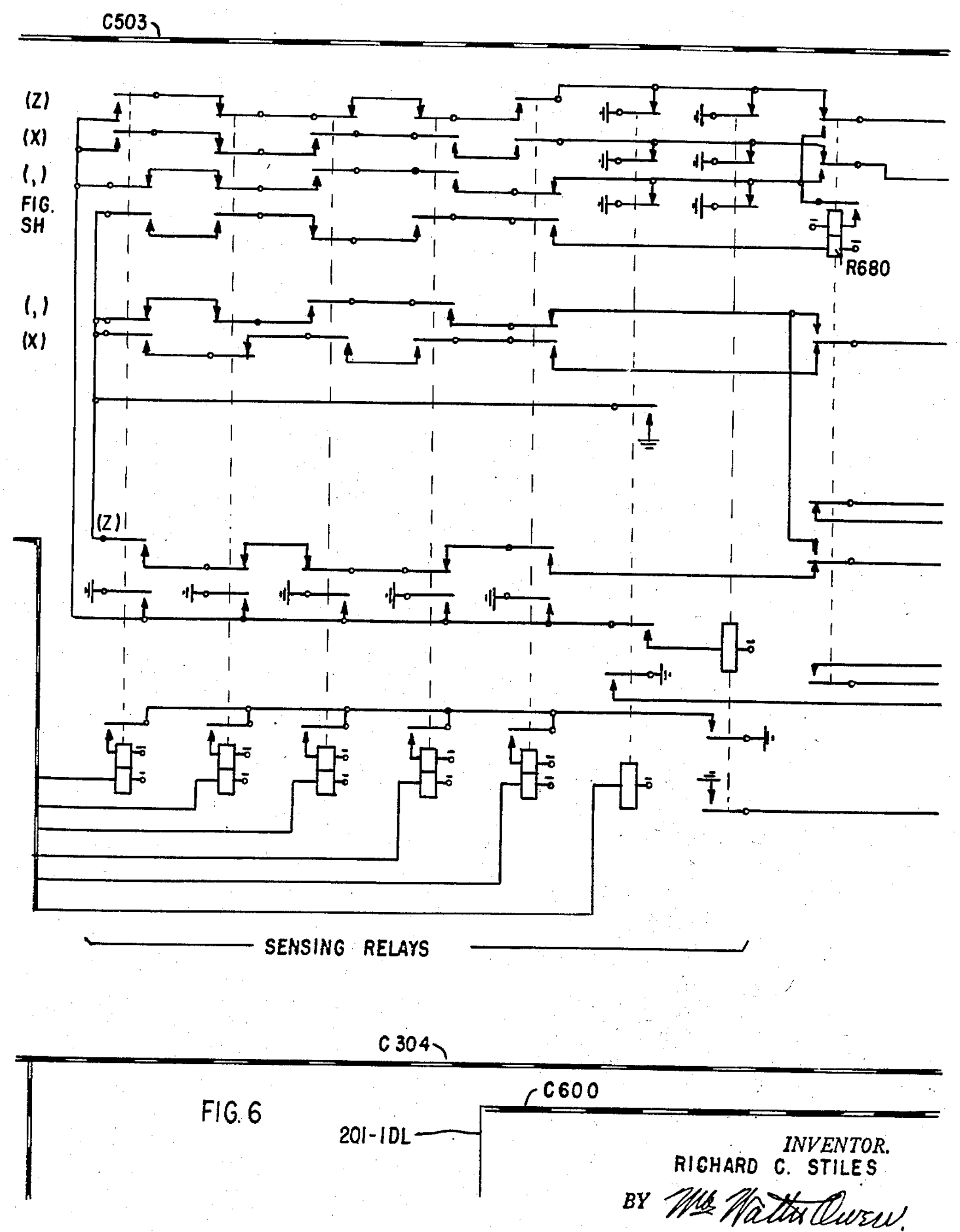
Figs. 6 to 13 show the control circuits in said one unit.
Figure 7:
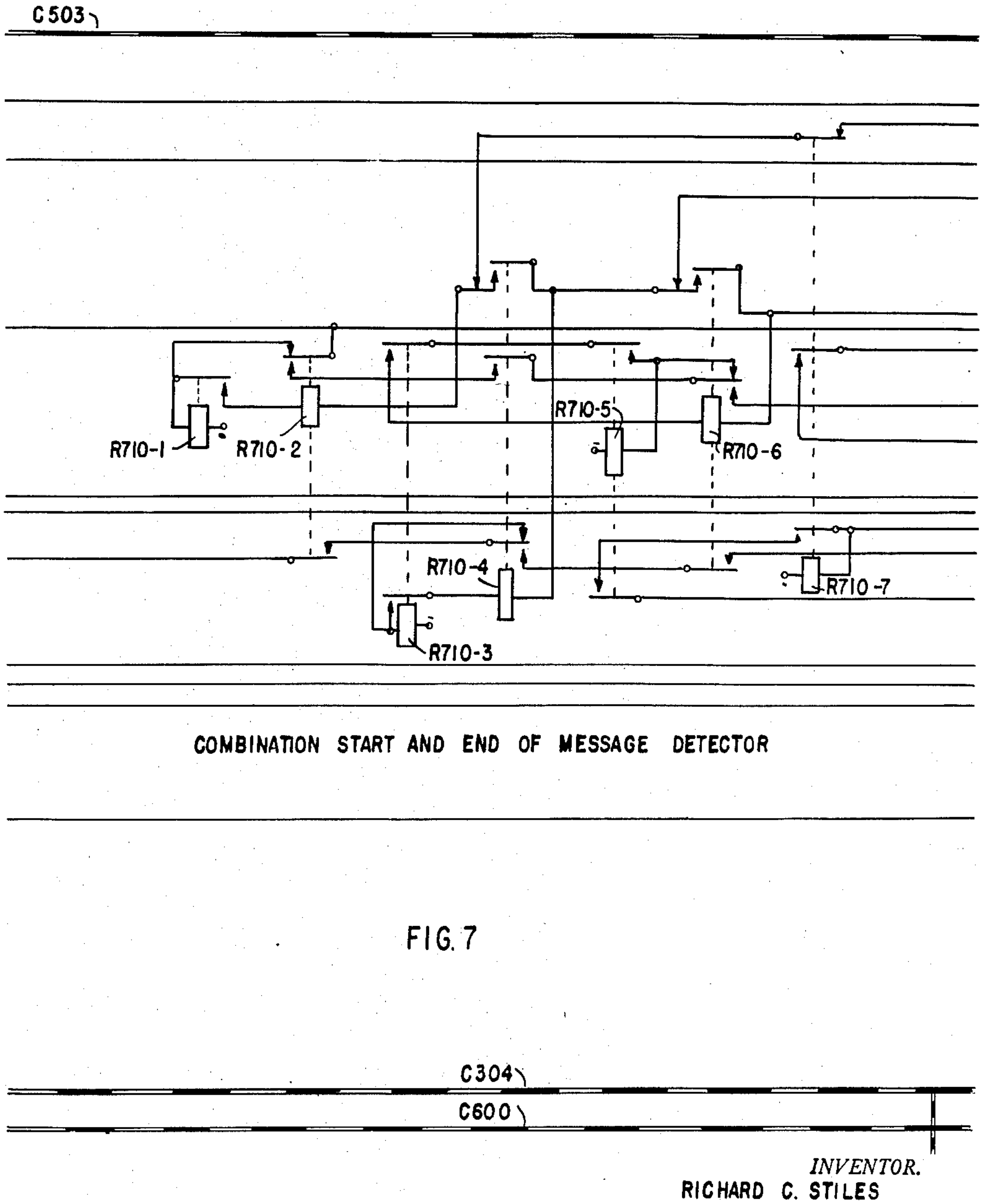
Figure 14:
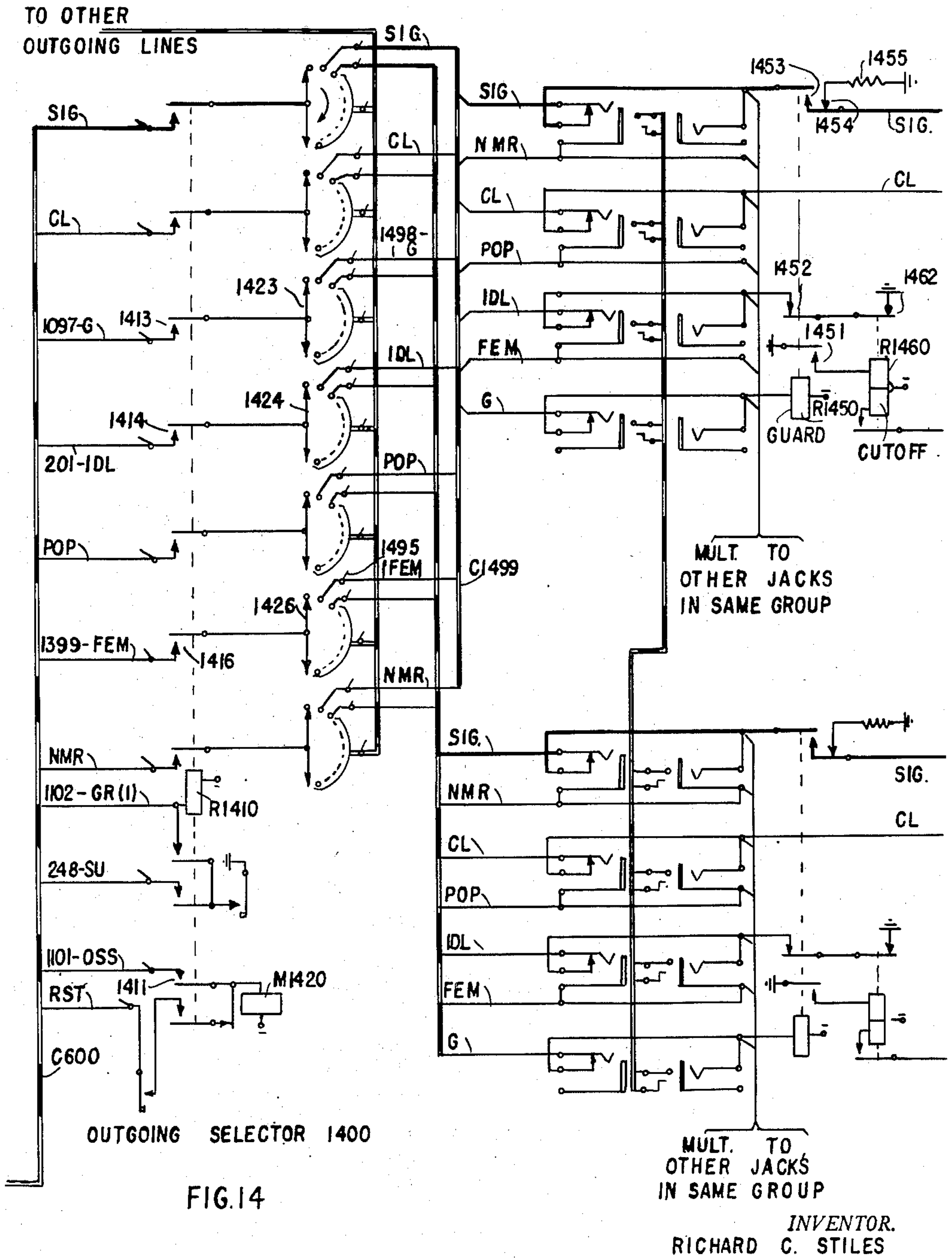
Fig. 14 shows an outgoing selector switch associated with said one unit.
Figure 15:
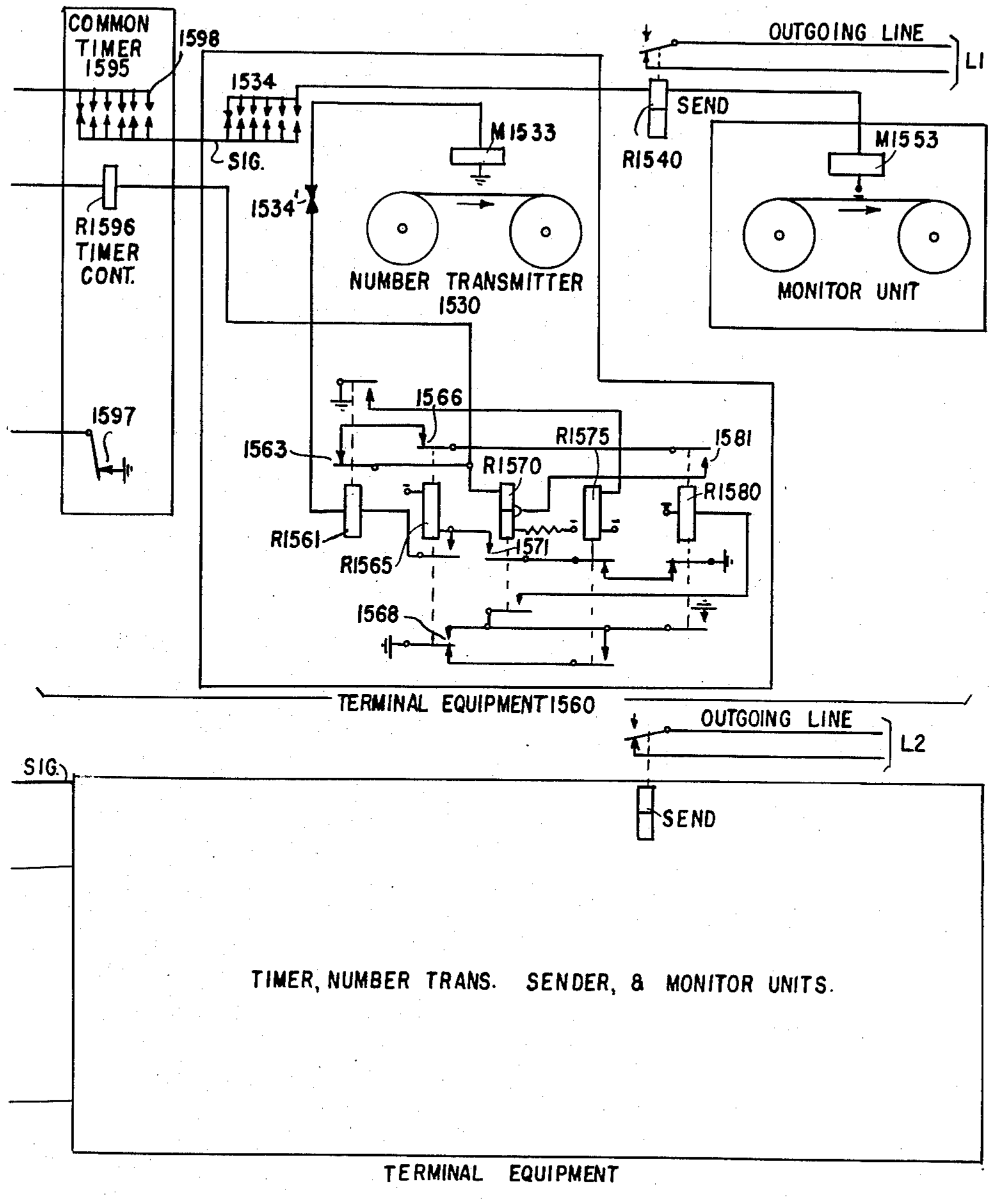

It will be further noted as regards Fig. 1 that the common control circuit 300 is shown in detail in Fig. 3, that the panel circuit 200 is shown in detail in Fig. 2, that the cross office selector switch 400 is shown in detail in Fig. 4, that reperforator 510, tape reader 520 and transmitter 530 are shown more fully in Fig. 5, that the outgoing selector switch 1400 is shown in detail in Fig. 14 and that the outgoing line equipment associated with two lines accessible to switch 1400 is shown in detail in Figs. 14 and 15. It will be noted that this outgoing line equipment corresponds to that shown in Figs. 43 and 44 of the above-mentioned copending application.

For purposes herein, the term "intercept trunk" will include the circuit extending from a cross office selector bank, through an individually associated control circuit to an individually associated reperforator. The term "semi-automatic message forwarding unit" will include a control circuit (individually associated with an intercept trunk to the extent that it has incorporated therein the above-mentioned control circuit which includes means for marking the intercept trunk busy or idle as well as the motor start circuit for the reperforator associated with the intercept trunk), a panel circuit, tape reader, transmitter and outgoing selectors all individually associated therewith. Obviously the equipment, such as the timer and number transmitter individually associated with each outgoing line, is necessary to properly "forward a message," but will not be included in the term "semi-automatic message forwarding unit" as used herein. The term "common control circuit" refers to the circuit shown in Fig. 3, which circuit is "common" to all semi-automatic message forwarding units.

In said copending application of R. C. Stiles, Serial No. 260,854, filed December 10, 1951, a detailed description is made of a cross office unit used to automatically forward a message received at the switching center in which the cross office unit is located. Briefly, when a message is received over an incoming line circuit of the switching center, a director is seized for processing the message. The director has means for automatically testing the cross office units for an available, partially-filled unit having stored therein messages of the same (low) precedence and destined to be transmitted over the same outgoing line as the received message. If none such unit is found, the director means then tests for an available empty cross office unit.

In either event, if a cross office unit is selected, a transmitting unit associated with the incoming line circuit sends the message to a reperforator associated with the selected cross office unit, the reperforator storing the message on a tape. The tape is fed automatically to a tape reader associated with the selected cross office unit, which tape reader detects the start of message indicator of the stored message and controls a start of message character counting arrangement. A transmitter is associated with the selected cross office unit and operates each time that the tape reader operates to sense a character. The character counting arrangement will stop the operations of the tape reader and its associated transmitter as soon as the start of message indicator is positioned just past the transmitter. At the same time, the character counting arrangement also prepares a circuit in the cross office unit for testing for the idle condition of the desired outgoing line. Subsequently, when the desired outgoing line is idle, when there are no messages of higher precedence awaiting transmission over the desired outgoing line and when the selected cross office unit is allotted for sending the received message stored therein, said selected cross office unit will seize the desired outgoing line and transmit the received message thereover.

However, if, when the director means is testing for an available cross office unit, none is found available, the director will route the message to an idle one of a plurality of intercept trunks.

Seizure of an intercept trunk by way of a cross office selector switch under the control of a director has been described in detail in the above-mentioned copending application and a cumbersome repetition is felt to be unnecessary herein. Briefly, when a cross office selector seizes an intercept trunk, means in the director will make a test to determine whether or not the trunk is busy, more specifically whether or not a message is being transmitted to said intercept trunk by way of another cross office selector under the control of another director. If the tested intercept trunk is found to be idle, an incoming message will be transmitted by way of the cross office selector to the reperforator associated with the idle intercept trunk.

GENERAL DESCRIPTION OF OPERATION

The control circuits associated with the intercept trunks are in many respects similar to those associated with the cross office units; except that, instead of the message being automatically sent out over the desired outgoing line, it will now be manually processed to some extent.

For example, the reperforator associated with a particular intercept trunk will not be affected in any way by the operation of the tape reader and transmitter associated with said trunk and vice versa. Instead, the tape, processed by the reperforator, will be fed to a storage bin common to all the reperforators associated with intercept trunks. An operator will remove the tape after the entire message has been printed and punched thereon. He will then select any idle tape reader and transmitter associated with any one of the intercept trunks; and, by means of semi-automatically controlled circuits, set the selected tape reader, transmitter and associated control circuits so that the transmitter can thereafter be controlled automatically to send the message over the desired line in a manner similar to that in which the cross office units forwarded a message, as described in the above-mentioned copending application of R. C. Stiles.

More specifically, when the message is to be forwarded, the operator first inserts the tape having the message recorded thereon into the tape reader and transmitter of any idle one of the six semi-automatic message forwarding units (each individually associated with one of the intercept trunks), for example unit 1, in such a manner that the first information to be transmitted will be that following a start of message indicator (recorded on the tape prior to other control information and the body of the message). Said indicator comprises the characters XZXZXZX.

Next the operator sets a "precedence" set knob in the panel circuit 200 of the forwarding unit 1 to a position corresponding to the priority of the message, and three "line" setting knobs also in said panel circuit 200 to positions corresponding to a predetermined outgoing selector switch associated with said unit and a predetermined outgoing line accessible to said switch.

Then the operator depresses a "set-up" button also in the panel circuit 200 to its "on" position to complete a circuit for operating a rotary switch in the common control circuit 300. The rotary switch selects and seizes the semi-automatic message forwarding unit 1. Upon said seizure, a second rotary switch in the common control circuit 300, under the control of the "precedence" set knob, operates to control a precedence marking switch in control circuit 1 to register the desired precedence in said semi-automatic message forwarding unit 1. Also upon the seizure of the message forwarding unit 1, a third rotary switch in the common control circuit 300 under the control of the first of said "line" setting knobs, operates to control a second switch in control circuit 1 to select a predetermined outgoing line selector switch, for example switch 1400, individually associated with message forwarding unit 1, switch 1400 having access to the desired outgoing line. When said outgoing line selector switch 1400 has been selected, a fourth switch in the common control circuit 300, under the control of the other two "line" setting knobs, operates to control the selected line selector switch 1400 in the message forwarding unit 1 to select the desired outgoing line. A set-up lamp lights, and the operator returns the set-up button to normal.

The common control circuit 300 restores automatically to normal and is ready to be utilized by another message forwarding unit; and the seized message forwarding unit 1 is partially conditioned for forwarding the message inserted in its tape reader and transmitter.

It may be well to note at this point that it is desirable that the outgoing lines and their associated equipment be accessible from the semi-automatic message forwarding units 1–6 in the same manner as said lines are accessible from the automatic cross office units, as described in detail in the above-mentioned copending application. Therefore, the control circuits 1–6 of the semi-automatic forwarding units 1–6, which control seizure of an outgoing line and which control the operation of the equipment individually associated with the seized line, must necessarily be similar to, if not identical with, the corresponding circuits of the automatic cross office units. Further, it is necessary that, when the semi-automatic message forwarding unit is conditioned (as described in part above) for forwarding a message inserted into its tape reader and transmitter, its circuits for controlling seizure of the outgoing line and for controlling the associated outgoing line equipment must be placed in the same condition as the corresponding circuits of the cross office units when they are conditioned for seizure of an outgoing line.

In view of the foregoing, it will be understood that the priority of the message is registered in the selected message forwarding unit and an outgoing line selector switch therein has been positioned on the desired outgoing line.

When the set-up lamp lights as previously described, a start of message button which operates contacts in control circuit 1 is momentarily depressed by the operator to the "on" position to simulate the detection of a start of message indicator by control circuit 1, to prepare a detector in control circuit 1 for the detection of an end of message indicator, to operate relays in control circuit 1 to simulate the proper positioning of the tape in the selected tape reader and transmitter and to prepare circuits in control circuit 1 to test for the busy or idle condition of the desired outgoing line.

A "read" button in the panel circuit 200 is then depressed to its "on" position to operate a "start" relay in control circuit 1, said relay further preparing said circuits for testing the condition of the desired line.

The operation of the semi-automatic message forwarding unit is thereafter automatically controlled by control circuit 1 and panel circuit 200. When the desired outgoing line becomes idle, when there is no message of higher precedence in another semi-automatic message forwarding unit or an automatic cross office unit, and when the selected message forwarding unit 1 is allotted for testing the desired line, its transmitter will be connected to said line to automatically transmit its stored message thereover. A the end of said transmission, said unit 1 will be restored to normal automatically except for the manual settings made therein, that is, at the end of said transmission, the "precedence" and "line" setting knobs must be restored to their normal positions manually and "read" button must be restored manually to its "off" position.

With respect to the transmission of the message, it will be noted that a "number transmitter" associated with the desired outgoing line sends the start of message indicator and a channel sequence number, and that a "timer" associated with the desired outgoing line sends the time of day and an end of message indicator. Both the "number transmitter" and the "timer" are controlled by means in the control circuits 1–6 in the semi-automatic message forwarding units in a manner similar to that described for corresponding cross office units of said copending application.

Provision is made for transmitting a "string" of messages recorded consecutively on a single continuous tape with a minimum of manual control and for controlling the semi-automatic message forwarding unit to restore to normal automatically only after the last message in said "string" of messages is transmitted.

DETAILED DESCRIPTION OF OPERATION

*Pre-setting a semi-automatic message forwarding unit*

When a message is to be forwarded by way of the semi-automatic message forwarding unit 1, an operator will first insert the message into the tape reader 520 and transmitter 530 associated therewith such that the message is positioned with its start of message indicator just past the transmitter sensing pins. The operator will next move the precedence set switch 250 to the desired opsition indicating the precedence of the message. This prepares a circuit that will be used to mark the bank of a control switch 330 in the common control circuit 300. The three selector set switches 260, 270 and 280 are next positioned to the contacts corresponding to the outgoing line selector which is to be utilized in transmitting the message and corresponding to the particular line over which the message is to be transmitted. This will prepare circuits which will be used to mark the banks of control switches 310 and 320 in the common control circuit 300. It will be noted that provision is made for ten outgoing line selectors, each having access to 25 lines; a total of 250 lines may therefore be available to a message forwarding unit.

After the above settings are made, the operator moves a set-up button to the "on" position, thereby to close contacts 247. When contacts 247 are closed, a circuit is completed for operating the magnet M345 in the common control circuit 300. Said operating circuit extends from ground over contacts 247, contacts 225, conductor 245–COM, contacts 306, off-normal contacts 303 of the switch 310, wiper 313 of switch 310 and its normal bank contact, wiper 333 of switch 330 and its normal bank contact, through the winding of magnet M345 to battery. M345 operates contacts 346 to operate the interrupter relay R305 over an obvious circuit. R305 operates to open contacts 306 in the previously described operating circuit for M345. M345 restores and steps its wipers one step. M345 restoring also restores R305. This relay interrupting sequence of operations will continue until the wipers of switch 340 encounter the bank contacts to which is connected the semi-automatic message forwarding unit 1, over which the message is to be transmitted.

Assume that the message is to be transmitted over the message forwarding unit 1, shown herein, which unit is connected to the first bank contacts of switch 340. When wiper 344 encounters its first bank contact an alternate circuit for operating M345 (and for maintaining M345 operated when its interrupter relay R305 is restored) is completed from ground over contacts 247 and 224, the winding of relay R230, conductor 244–C(1), wiper 344, the winding of relay R350, off-normal contacts 303, wipers 313 and 333 through the winding of magnet M345 to battery. Therefore, when M345 operates the second time followed by the second operation of R305, M345 is maintained operated. Relays R230 and R350 are also operated over this alternate operating circuit of M345.

Relay R230 closes contacts 231 to mark the bank of control switch 330; at contacts 232, completes a circuit for marking the bank of control switch 310; and, at contacts 233, completes a circuit for marking the bank of control switch 320.

When relay R350 operates, it completes at contacts 355 an obvious circuit for operating the slow-to-release relay R365; at contacts 357, completes a circuit for operating the magnet M335, said circuit extending from ground at contacts 357, over contacts 361 and 397, through the winding of M335 to battery; at contacts 352, completes a circuit extending from ground over contacts 352, 381 and 371, through the winding of M315 to battery for operating M315; and, at contacts 358, completes a circuit for maintaining M345 operated after switches 310 and 330 are stepped off normal, said circuit extending from ground over contacts 247 and 224, the winding of relay R230, conductor 244–C(1), wiper 344, the winding of relay R350, contacts 358, through the winding of M345 to battery.

Relay R365, when operated, opens contacts 366 for timing purposes, as will be described later.

Figure 10:
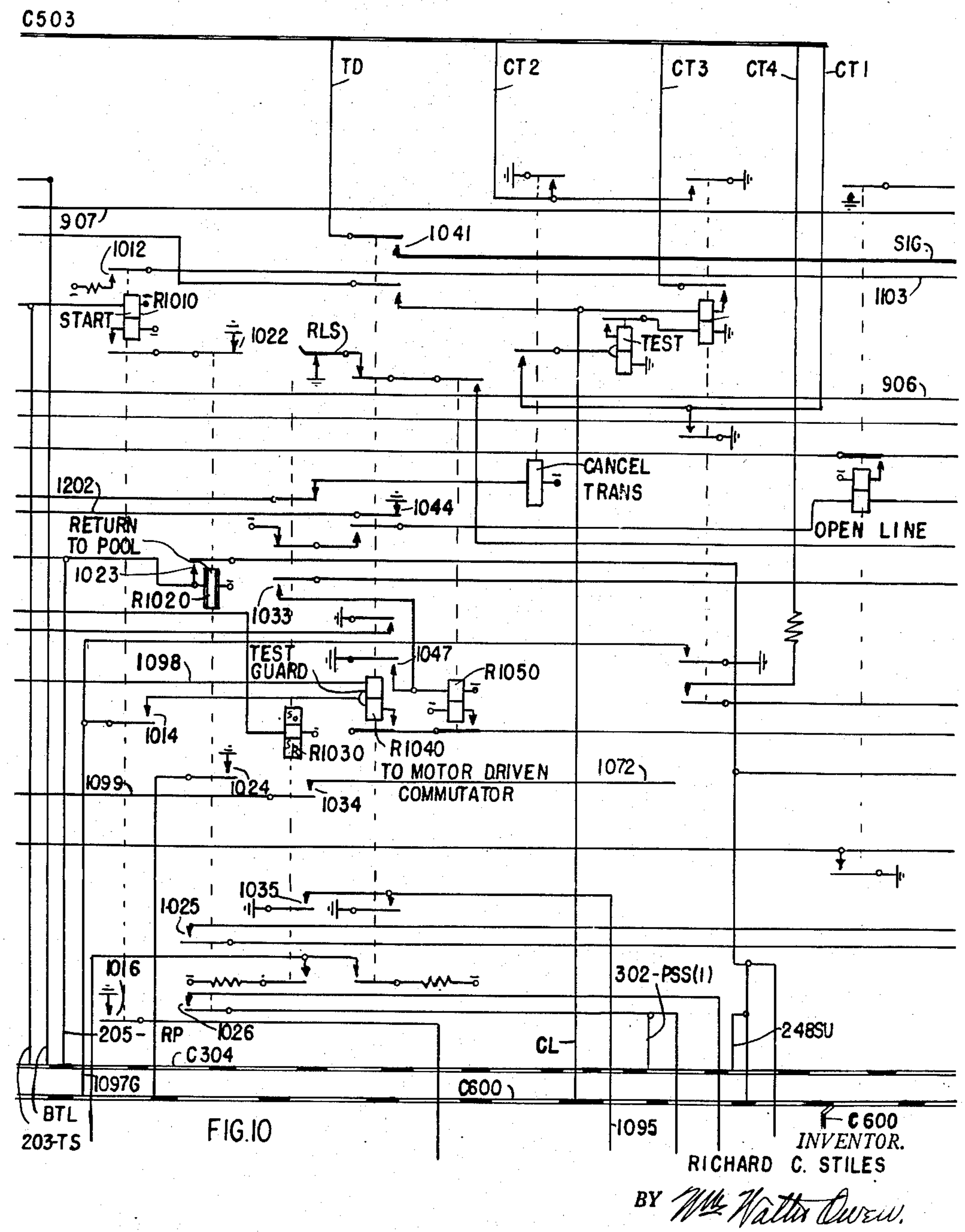
Figure 13:
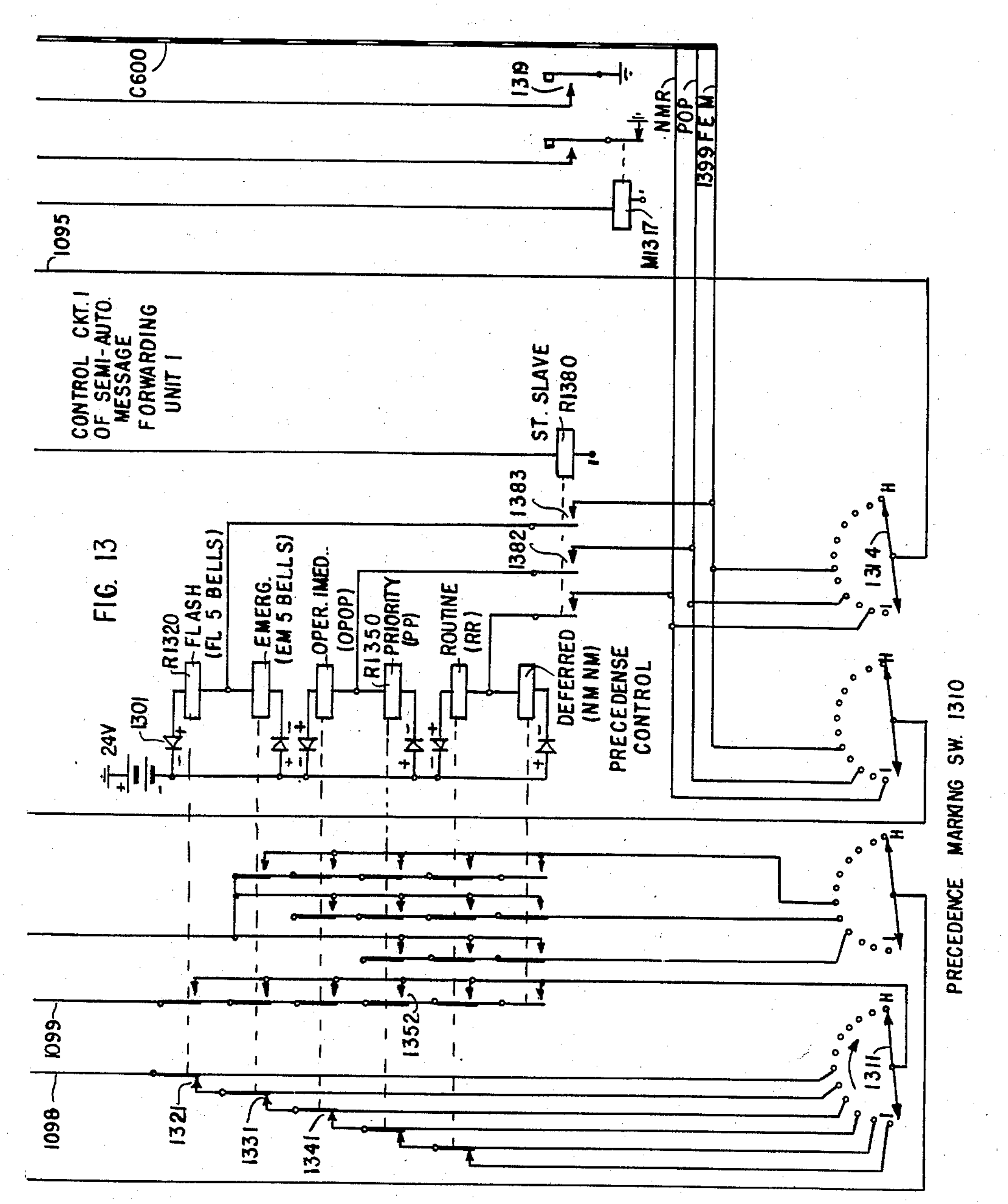

When the magnet M335 operates, it closes contacts 337 to complete a circuit for operating the interrupter relay R360 and for operating the magnet M1317 of the precedence marking switch 1310, said circuit extending from ground over contacts 337, through the winding of R360, contacts 356, wiper 342 and its first bank contact, conductor 302–PSS(1) by way of cable C304 to Fig. 10, thence to Fig. 13 and through the winding of M1317 to battery. R360 and M1317 operate. When R360 operates, it opens contacts 361 in the previously described circuit for operating M335. M335 restores to step the wipers of switch 330 to the first bank contacts. M335 also restores R306 and M1317. M1317 steps the wipers of the precedence marking switch 1310 to the first bank contacts accessible thereto. This sequence of operations of M335, R360 and M1317 will be continued until the wiper 331 of switch 330 encounters the bank contact which was marked by the operation of relay R230. Assuming that the message to be transmitted is of a priority (PP) precedence, the bank marking circuit will extend from ground over contacts 231, wiper 251, the third bank contact of the precedence switch 250, conductor 252–PP by way of cable C242 to Fig. 3, to the third bank contact accessible to wiper 331. Therefore, when the wiper 331 encounters said third bank contact, said marking circuit will operate R395. When R395 operates, it opens contacts 397 to prevent further operation of M335; and, at contacts 396, prepares a circuit for operating relay R220.

Figure 11:
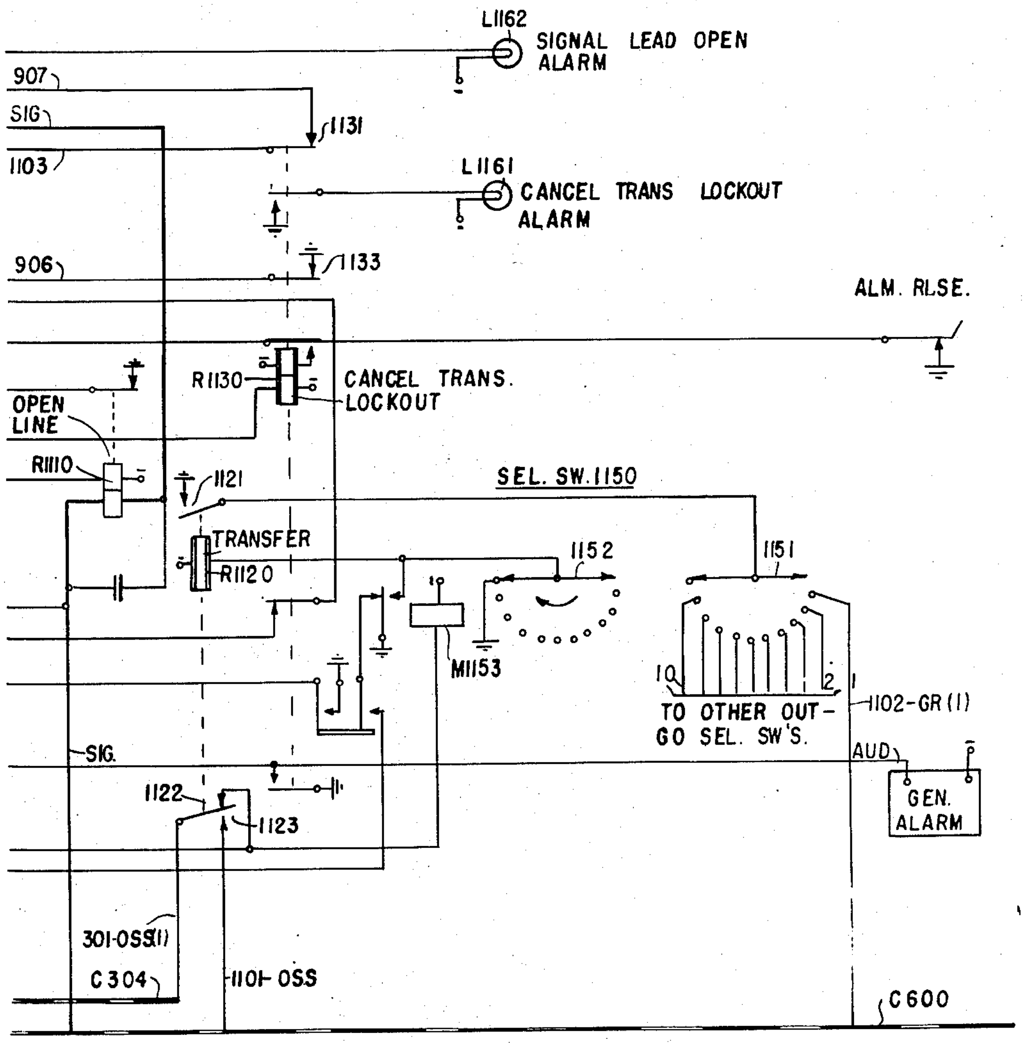

When M315 operates in response to the operation of R350, as previously described, it closes contacts 316 to complete a circuit for operating the interrupter relay R380 and the magnet M1153 of the selector switch 1150, said circuit extending from ground over contacts 316, the winding of R380, contacts 372, wiper 341 and its first bank contact, conductor 301–OSS(1) by way of cable C304 to Fig. 11, contacts 1122, through the winding of M1153 to battery. R380 and M1153 operate. When R380 operates, it opens at contacts 381 the previously described circuit for operating M315; and M315 restores to step its wipers to the first bank contacts. R380 and M1153 restore, the latter stepping the wipers of the selector switch 1150 to the first bank contacts accessible thereto. When R380 restores, it closes the operating circuit for M315. This sequence of operations of M315, R380 and M1153 will be repeated until wiper 312 of switch 310 encounters the bank contact marked when R230 was operated. Assume that the selector set switch 260 was set with its wiper 261 engaging the first bank contact. When M315 restores after its first operation to step wiper 312 into engagement with its first bank contact, a circuit will be completed for operating relay R370, said circuit extending from ground over contacts 232, wiper 261 and its first bank contact, conductor 262–H1 by way of cable C243 to Fig. 3, wiper 312 and its first bank contact, through the winding of R370 to battery. R370, when operated, opens at contacts 371 the previously described circuit for operating M315, thereby to prevent further operation of M315. At contacts 373, R370 prepares a circuit for operating the magnet M1420 of the outgoing selector switch 1400; at contacts 374, prepares a circuit for operating the magnet M325 of control switch 320; and, at contacts 375, opens the circuit for operating slow-to-release relay R365.

Referring back to the first restoration of magnet M1153 of the selector switch 1150, it will be noted that, when wiper 1152 stepped off its first bank contact, it opened the operating circuit of the normally operated transfer relay R1120. R1120 is a slow-to-release relay with a release time interval long enough to permit the selection of any one of the ten outgoing selector switches available to the message forwarding unit 1, shown herein, before it will fully release. When R1120 releases, it closes contacts 1121 to complete a circuit for operating the connect relay R1410 of the outgoing selector switch 1400, said circuit extending from ground over contacts 1121, wiper 1151 and its first bank contact, conductor 1102–GR(1) by way of cable C600 to Fig. 14, through the winding of connect relay R1410 to battery; and, at contacts 1123, R1120 further prepares the circuit for operating M1420. When connect relay R1410 operates contacts 1411, it prepares a further point in the operating circuit for M1420.

As previously described, the slow-to-release relay R365 restores in response to the operation of R370. The release time of R365 is adjusted so that it will release completely shortly after the transfer relay R1120 has completely released. When R365 fully restores, it closes contacts 366 to complete a circuit for operating the magnet M325 of switch 320, said circuit extending from ground over contacts 391, 387, 366 and 374, through the winding of M325 to battery. M325 operates and closes contacts 326 to complete a circuit for operating the interrupter relay R390 and magnet M1420 of the outgoing selector switch 1400, said circuit extending from ground over contacts 326, the winding of R390, contacts 373, wiper 341 and its first bank contact, conductor 301–OSS(1) by way of cable C304 to Fig. 11, contacts 1123, conductor 1101–OSS by way of cable C600 to Fig. 14, contacts 1411, through the winding of M1420 to battery. R390 and M1420 operate. At contacts 391, R390 opens the previously described circuit for operating M325. M325 restores to step its wiper 321 to the first bank contact accessible thereto. R390 and M1420 restore, the latter stepping the wipers of the outgoing selector switch 1400 to the first bank contacts accessible thereto. When R390 restores, it completes the circuit for operating M325. This sequence of operations of M325, R390 and M1420 will continue until wiper 321 of switch 320 encounters the bank contact marked by the operation of R230. Assume that selector set switch 270 has been set with its wiper 271 on the top bank contact. Assume further that the selector set switch 280 has been set with its respective wipers engaging their first bank contacts. As a result thereof, when M325 restores after its first operation to step its wiper 321 to the first bank contact, a circuit will be completed for operating R385, said circuit extending from ground over contacts 233, wiper 271 and its top bank contact, wiper 281 and its first bank contact, conductor 284–U1 by way of cable C243 to Fig. 3, wiper 321 and its first bank contact, through the winding of R385 to battery. R385 operates contacts 387 to open the previously described circuit for operating M325, thereby to prevent further operation of M325. At contacts 386, R385 completes a circuit for operating relay R220, said circuit extending from ground over contacts 386 and 396, wiper 343 and its first bank contact, conductor 246–B(1) through the upper winding of R220 to battery. R220 operates; at contacts 227, completes a holding circuit extending from battery over its lower winding, contacts 227, conductor 248–SU by way of cable C304 to Fig. 10 and thence to Fig. 13, through off-normal contacts 1319 of the precedence marking switch 1310 to ground. At contacts 226, R220 completes an alternate circuit for maintaining itself operated. At contacts 224, R220 opens the holding circuit for R230, R350 and M345, said relays and magnet restoring. When M345 restores, it advances its wipers to the next bank contacts accessible thereto and restores R305. When R230 restores, it opens the previously described marking circuits, thereby to restore R370, R385 and R395. When R350 restores, it completes at contacts 351 a self-interrupting circuit for causing the magnet M315 to restore its wipers to normal, said circuit extending from ground to contacts 317 and 351, the multipled bank contacts accessible to wiper 311, wiper 311, through the winding of M315 to battery. At contacts 353, R350 completes a self-interrupting circuit for causing magnet M325 to restore its wiper to normal, said circuit extending from ground over contacts 327 and 353, off-normal contacts 322, through the winding of M325 to battery. At contacts 354, R350 completes a self-interrupting circuit for causing M335 to restore its wipers to normal, said circuit extending from battery through the winding of M335, wiper 332, the multipled bank contacts accessible to wiper 332, and contacts 354 and 336 to ground. Therefore the common control circuit 300 is now restored to normal (except for switch 340 which is non-homing) and can be utilized by another semi-automatic message forwarding unit to preset said unit.

Referring again to the operation of R220, said relay prepares at contacts 221 a point in the circuit for operating the test relay R1030; at contacts 222, prepares a point in the circuit for operating the start relay R1010; and, at contacts 223, completes a circuit for lighting the set-up lamp L241.

The semi-automatic message forwarding unit is now pre-set as regards the precedence marking switch, selection of the desired outgoing selector switch and selection of the desired outgoing line.

In order to place the message forwarding unit in a condition so that it will thereafter be controlled automatically to send the message, it is still necessary to simulate therein the operations which indicate that a start of message indicator has been detected and that the tape is properly positioned in the transmitter.

Figure 8:
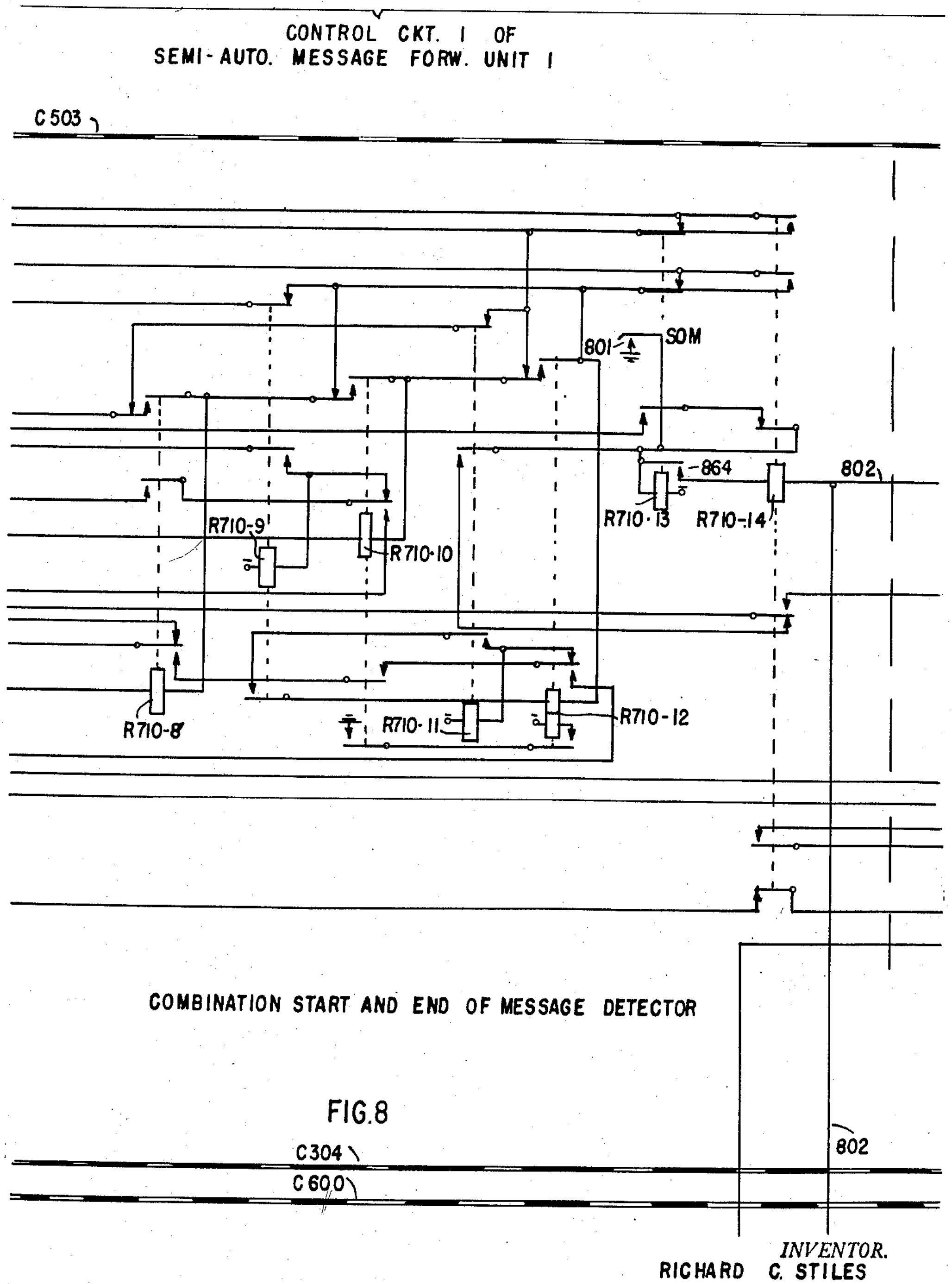
Figure 9:
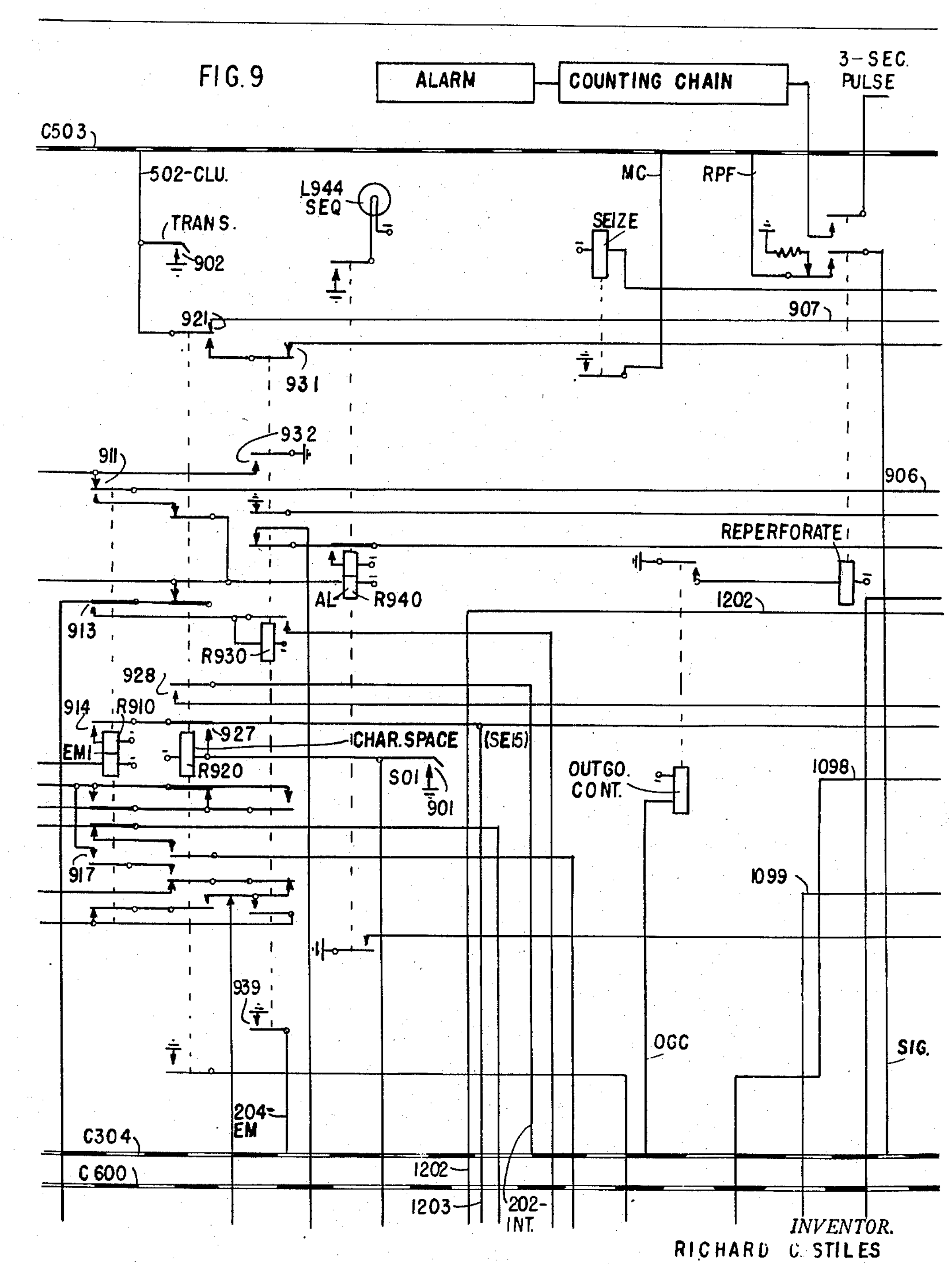
Figure 12:
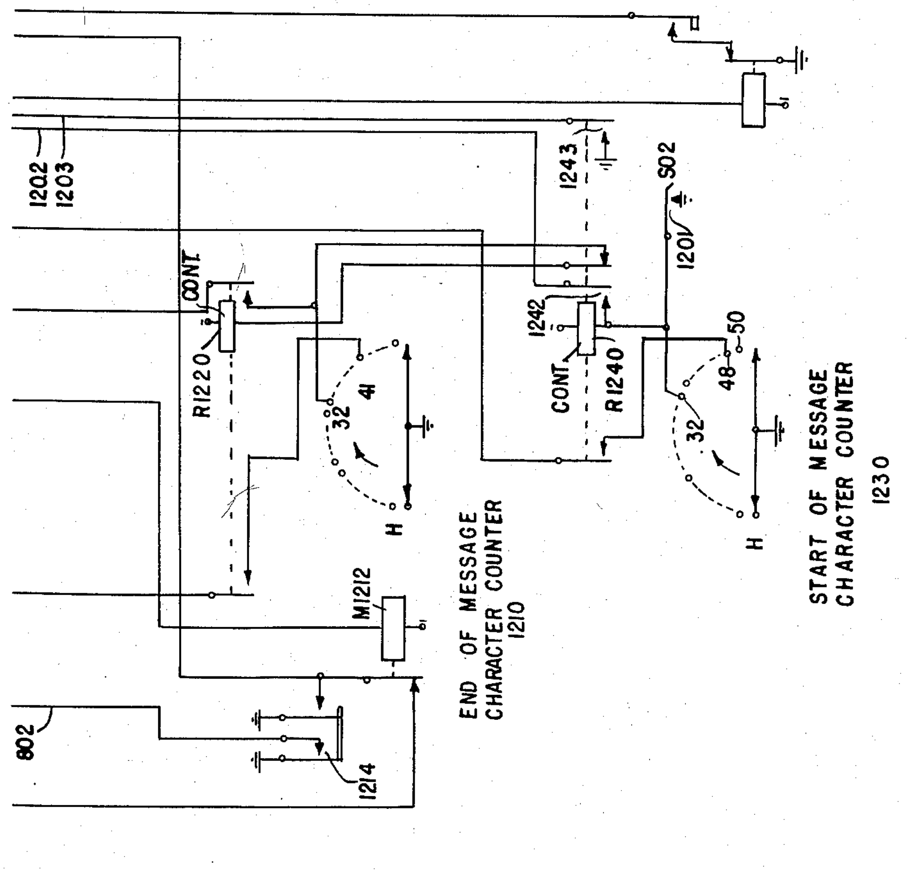

When the set-up lamp L241 lights, the operator returns the set-up button to normal to open contacts 247 and momentarily depresses a start of message button which closes the start of message contacts 801 in Fig. 8, 901 in Fig. 9 and 1201 in Fig. 12. A commercial application of the circuits probably would utilize a single set of contacts in the panel circuit 200 with multiple leads for grounding the desired conductors; but, for ease of description herein, three sets of contacts are shown, each directly associated with the circuit it controls. It may be well to observe at this point that various other features one might expect to find in the panel circuit of a commercial application have been located elsewhere herein for ease of description, for example the stop-transmission, button-operated contacts 902 and the alarm lamp L944 shown in Fig. 9, and alarm lamps L1161 and L1162 shown in Fig. 11.

In the previously mentioned copending application of R. C. Stiles, it was explained in detail that a cross office unit reperforator recorded a message in a tape fed therethrough in response to signals received from an incoming line transmitter, that the cross office unit was controlled by a director to set its precedence marking switch, similar to switch 1310, to select a predetermined outgoing selector switch such as switch 1400 and to set the wipers of said selector switch to engage the equipment associated with a predetermined outgoing line. It was further described in detail that a combination start and end of message detector, such as that shown in Figs. 7 and 8 herein, was controlled in response to signals from the cross office unit tape reader to detect a start of message indicator recorded in the tape at the beginning of the message. Subsequently, control relays such as R1240 and R920 were operated to indicate the desired positioning of the tape in the transmitter, the latter relay preparing a circuit for a test relay such as R1030 herein. The cross office unit was then in condition for transmitting the message when the outgoing line became idle, when there were no other messages of higher precedence to be sent over the same line and when the cross office unit was allotted for sending its stored message.

In the semi-automatic message forwarding unit of this application, the start and end of message detector and the control relays R1240 and R920 will be controlled in a similar manner during the transmission of all messages in a "string" of messages on a single unbroken tape except the first.

However, when a single message is to be transmitted and when the first message of a "string" of messages is to be transmitted, a more simple method is provided for performing the function of the start and end of message detector and for operating control relays R1240 and R920. That is, the start of message contacts 1201 and 901 when closed by the operator respectively operate relays R1240 and R920, which relays lock themselves operated, R1240 over a circuit including contacts 1242, conductor 1202 and contacts 1044 and R920 over a circuit including contacts 927, conductor 1203 and contacts 1243. The start of message contacts 801 operate relay R710–13 over an obvious circuit while the start of message button is depressed; and, when said button is released, contacts 801 open and R710–13 is maintained operated over a circuit including contacts 864, relay R710–14, conductor 802, contacts 911, conductor 906 and contacts 1133. Relay R710–14 operates over said last-mentioned circuit. This simple and time saving method of operating relays R710–13, R710–14, R920 and R1240 may be utilized since the purpose of operating relays R710–13 and R710–14 in a cross office unit is to indicate the receipt of a correct start of message indicator —which the operator can and will check visually—and the purpose of operating relays R1240 then R920 in a cross office unit is to prevent the seizure of the desired line and the transmission of the message until the tape is correctly positioned in the transmitter with the start of message indicator just past the transmitter—which positioning is done manually by the operator in a semi-automatic message forwarding unit.

When relays R710–13 and R710–14 operate, they prepare a circuit for the end of message relay R910 and the sequence alarm relay R940.

When the start of message control relay R920 operates, it prepares circuits for the clutch magnet M525 of the tape reader and for the test relay R1030.

The semi-automatic message forwarding unit is now conditioned for being started.

*Starting the semi-automatic message forwarding unit*

In view of the foregoing, it will be remembered that the precedence marking switch 1310 has been set with its wipers engaging the third bank contacts to mark the message as being of a "priority" precedence, that the outgoing selector switch 1400 has been selected and its wipers set to engage the equipment associated with the outgoing line L1, and that relays R220, R710–13, R710–14, R920, R1240 and R1410 are in an operated position.

It will be noted further that a circuit for test relay R1030 has been prepared, said circuit extending from battery, through the winding of R1030, contacts 928, conductor 202–INT by way of cable C304 to Fig. 2, contacts 211 and 221, conductor 201–IDL by way of cable C600 to Fig. 14, contacts 1414, wiper 1424 and its first bank contact. Each time that the line L1 and its associated equipment are idle, ground will be connected to said first bank contact accessible to wiper 1424 by way of contacts 1462 and 1452 and the IDL conductor connected to said first bank contact. Therefore test relay R1030 will operate whenever L1 is idle.

Now the operator will depress the "read" button to its "on" position to close contacts 206. A circuit will then be completed for operating the start relay R1010 of the semi-automatic message forwarding unit 1, said circuit extending from ground over contacts 206, 222 and 212, conductor 203–TS by way of cable C304 to Fig. 10, through the upper winding of R1010 to battery. R1010 operates.

Except where otherwise indicated by a detailed circuit description, the further operation of the semi-automatic message forwarding unit 1 will be similar to that of the automatic cross office unit 3400, described in detail in the above-mentioned copending application of R. C. Stiles. In view of said detailed description, it is felt that a burdensome repetition of the detailed tracing of most of the circuits is unnecessary except where a difference in circuits or operations results.

In pursuance of this objective, it will be understood that, when R1010 operates and locks itself operated over an obvious circuit, it prepares at contacts 1014 a test circuit for test guard relay R1040; and, at contacts 1016, completes a circuit for operating the start slave relay R1380. R1380 completes at contacts 1382 a circuit for operating the "priority" relay R1350.

At contacts 1352, R1350 further prepares the circuit for operating the test guard relay R1040.

Assume that the outgoing line L1 is now idle and relays R1030, R1350 and R1380 are operated, that no other cross office unit or semi-automatic unit has a message of higher precedence stored therein, and that the semi-automatic unit 1 herein is allotted for use, that is, a ground pulse is placed upon conductor 1072 by a motor driven commutator (not shown). The test guard relay R1040 and the guard relay R1450, which latter relay is individually associated with the outgoing line L1, will operate in series over a circuit extending from the grounded conductor 1072, over contacts 1034, conductor 1099 extended to Figs. 9 and 13, contacts 1352, wiper 1311 and its third bank contact, contacts 1341, 1331 and 1321, conductor 1098 extended to Figs. 9 and 10, the upper winding of R1040, contacts 1014, conductor 1097–G by way of cable C600 to Fig. 14, contacts 1413, wiper 1423 and its first bank contact, conductor 1498–G by way of cable C1499 to contacts 1497 and the winding of R1450 to battery.

At contacts 1041 and 1453, relays R1040 and R1450 complete the signalling circuit over which the send relay R1540 and the monitor unit perforating magnet M1553 are controlled from the pulsing contacts 590 of the outgoing transmitter 530 as well as from the pulsing contacts 1598 and 1534 of the timer 1595 and the number transmitter 1530.

At contacts 1452, R1450 causes the test relay R1030 to restore; and, at contacts 1451, operates the cut-off relay R1460.

At contacts 1042, R1040 completes a circuit for operating the timer control relay R1596 and relay R1570 in series with the clutch magnet M525 of the tape reader 520, but M525 does not operate over this circuit; at contacts 1044, causes the start of message control relay R1240 to restore; at contacts 1047, completes a circuit for operating the open line relay R1110 before test relay R1030 opens the circuit at contacts 1033, relay R1110 being held operated over the above-mentioned signalling circuit in series with relays R1596 and R1570; and, at contacts 1047, R1040 also operates relay R1050.

When relay R1570 is operated, it closes contacts 1571 to operate relay R1565. R1565 closes contacts 1568 to operate relay R1580, which latter relay opens the original operating circuit for R1565. R1565 then is maintained operated in series with relay R1561 and magnet M1533 of the number transmitter 1530. R1561 operates R1575.

The number transmitter 1530 controls R1540 to send a start of message indicator and the proper channel sequence number of the message over the outgoing line L1, for example the number 005 is sent if this is the fifth message to be sent over L1 on the particular day, etc. This information is sent under the control of a pre-cut tape associated with the number transmitter.

After the channel number is sent, contacts 1534 are controlled to open momentarily; M1533, R1561 and R1565 restore followed by the restoration of R1575. The upper high-resistance winding of R1570 is thereupon short-circuited by a circuit including contacts 1581, 1566 and 1563; and the clutch magnet M525 operates in series with the low-resistance lower winding of R1570.

The transmitter 530 is now controlled to send the stored message except for the end of message indicator which will be sent by the timer 1595.

When the tape reader 520 senses a correct end of message indicator, the start and end of message detector (shown in Figs. 7 and 8 herein) is controlled to operate the end of message relay R910, which relay operates contacts 914 to lock itself operated, opens contacts 911 to restore R710–13 and R710–14, operates contacts 913 to prepare a circuit for the control relay R930, and closes contacts 917 to prepare a circuit for the magnet M1212 of the end of message character counter 1210. Briefly, the end of message indicator (a Fig. Shift and seven commas), is sensed by the tape reader 520. The relays R710–1 and R710–2, R710–3 and R710–4, R710–5 and R710–6, R710–7 and R710–8, R710–9 and R710–10, R710–11 and R710–12 are respectively operated by the first six commas, after the Fig. Shift character has operated relay R680 all in a manner described in the copending application. Since relays R710–13 and R710–14 have been operated previously by the start of message button, the seventh comma will operate R910 as described in said copending application.

When a predetermined number of characters after the end of message indicator have been counted by the character counter 1210, the control relay R1220 operates; then, after another predetermined number of characters have been counted, R930 is operated. The purpose of character counter 1210 is to operate R930 at the moment that the first character of the end of message indicator reaches the transmitter 530. R930 operates and stops the transmitter 530 and tape reader 520 by opening at contacts 931 the circuit for the clutch magnet M525 of the tape reader. Relays R1570 and R1596 also restore when said circuit is opened followed by the restoration of R1580, R1596 calling in the timer 1595 to transmit over line L1, the time of day and an end of message indicator.

When R930 operates, it also causes the test guard relay R1040, the guard relay R1450 and control relay R1220 to restore. It also completes a circuit for causing M1212 to restore the end of message character counting switch to normal, and finally, at contacts 939, completes a circuit for operating relay R210, said circuit extending from ground over contacts 939, conductor 204–EM by way of cable C304 to Fig. 2, through the upper winding of R210 to battery. R210 operates. When the character counter 1210 is restored to normal, it causes R930 to restore.

When the test guard relay R1040 restores, as previously described, it restores R920, R910, R1050, R1110 and R1350. When the guard relay R1450 restores, it prepares an alternate circuit including the resistance element 1455 and contacts 1454 for maintaining the sends relay R1540 and magnet M1553 operated so that they may be controlled by the timer 1595, which timer as previously stated send the end of message indicator, the day of the month and the time of day. After the timer 1595 sends said information, contacts 1597 are controlled to open momentarily to restore the cut-off relay R1460, which restoration causes contacts 1462 to close, marking the outgoing line L1 as idle and available for the transmission of another message.

It will be recalled that, during the description of the "set-up" operations, no mention was made of the "auto reset" button which controls contacts 207 and 208 and therefore it is assumed to be in its normal "off" position as shown in Fig. 2. It will further be recalled that as previously described, the "read" button was depressed to its "on" position and left there. This positioning of the "read" button to the "on" position while the "auto reset" button is in the "off" position is made only if a single message is to be transmitted. Therefore, it has been assumed in the above description that only one message is to be sent over line L1.

*Restoration of the semi-automatic message forwarding unit to normal*

It will be remembered that relay R210 was operated in response to the operation of relay R930. At contacts 211, R210 opens the test circuit for test relay R1030; at contacts 212, opens the original operating circuit of start relay R1010, but R1010 will remain operated over its holding circuit; and, at contacts 214, completes a circuit for operating the return to (idle) pool relay R1020, said circuit extending from ground over contacts 206 of the "read" button, contacts 207 of the "auto reset" button, contacts 214, conductor 205–RP by way of cable C304 to Fig. 10, through the winding of R1020 to battery. R1020 operates and completes at contacts 1023 a circuit for maintaining itself operated after R210 restores. R210 will restore shortly after its operation in response to the previously described restoration of relay R930, which relay operated R210.

When R1020 operates, it opens contact 1022 to restore the start relay R1010, followed by the restoration of the start slave relay R1380; at contacts 1024, completes a self-interrupting circuit for magnet M1420 to cause the selector switch 1400 to be restored to normal, at which time the connect relay R1410 restores; at contacts 1025, completes a self-interrupting circuit for magnet M1153 to cause the selector switch 1150 to be restored to normal, at which time the transfer relay R1120 reoperates; and, at contacts 1026, completes a self-interrupting circuit for magnet M1317 to cause the precedence marking switch 1310 to restore to normal. When the switches 1150, 1310 and 1400 are all restored to normal, ground will be removed from the conductor 248–SU, thereby to restore R220.

The relay R1020 is also maintained operated over a branch of conductor 248–SU as shown in Fig. 10. When ground is removed from said conductor 248–SU as described above and when R210 has restored to open the original operating circuit of relay R1020, said relay R1020 will restore. Said relay R1020 has been made slow-to-release to prevent the start relay R1010 from being maintained operated over contacts 1022 after the forwarding unit is released in case that it reoperates when R210 restores to close its operating circuit before R220 restores to open said circuit. R220 and R1020 begin to restore simultaneously, but both R220 and R1010 will restore fully before the slow-to-release relay R1020 can fully restore.

It will be noted that at this point the semi-automatic message forwarding unit 1 is in its original condition except for the selector set switches 260, 270 and 280, the precedence set switch 250 and the "read" button all of which must be restored to normal manually.

*Sending messages over a line in a predetermined order*

Assume that the semi-automatic message forwarding unit 1 has a message stored therein, that its precedence marking switch 1310 has been set to the priority precedence position (its wipers are engaging the third bank contacts), and that unit 1 is connected to the L1 line equipment by way of selector switch 1400. Assume further that the semi-automatic message forwarding unit 2 has a message stored therein, that its precedence marking switch (similar to 1310) has its wipers engaging the sixth bank contacts to register a "flash" precedence, and that said unit 2 is also connected to the L1 line.

Assume also that the line L1 is now idle. As previously described, the test relays corresponding to R1030 in all of the message forwarding units 1–6 having messages awaiting transmission over L1 are operated when L1 is idle; therefore R1030 and the corresponding relay in unit 2 are both operated. As previously described, R1030 when operated operates the priority relay R1350. In unit 2, the relay corresponding to R1030 operates its flash relay corresponding to flash relay R1320 (the start slave relay R1380 and its corresponding relay in unit 2 being operated). A branch of the circuit for operating the priority relay R1350 extends to unit 2 in a manner described in said copending application to operate the corresponding priority relay in unit 2. Also it will be noted that when the test relay in unit 2 operates, it closes contacts corresponding to contacts 1035 of unit 1 to operate the flash relay R1320 of unit 1 (as well as its corresponding flash relay) over a circuit extending from ground over contacts corresponding to 1035, a conductor corresponding to conductor 1095, a wiper corresponding to wiper 1314 and its sixth bank contact, a conductor corresponding to conductor 1399–FEM by way of a cable corresponding to C600 to contacts corresponding to contacts 1416 of Fig. 14 herein, a wiper corresponding to wiper 1426 and its first bank contact, a conductor 1495 (partly shown in Fig. 14), wiper 1426 and its first bank contact, contacts 1416, conductor 1399–FEM by way of cable C600 to Fig. 13, contacts 1383, the winding of R1320 and the rectifier 1301 to battery.

Assume further that the motor driven commutator (not shown) sends a ground pulse over the conductor 1072 of unit 1. As previously described, this ground pulse to unit 1 will operate the test guard relay R1040 if no other message of higher priority is awaiting transmission over the same line as that to which said unit 1 is connected. However since unit 2 has a message of flash precedence, test guard relay R1040 will not operate because the previously described operating circuit for R1040 is open at contacts 1321 which were operated by the operation of the flash relay R1320.

In view of the foregoing, it will be understood that unit 1 can send its priority message only after unit 2 has sent its flash message.

*Transmission of a "string" of messages recorded on a single tape*

A "string" of messages recorded consecutively on a single tape will be processed as a group with a minimum of manual control only if they are to be given the same priority and if they are to be transmitted over the same outgoing line. Examples of messages to be so processed are (1) those taken from a faulty cross office unit (such as that described in the above-mentioned copending application of Stiles) which had stored therein two or more messages of the same (low) precedence and having the same destination, and (2) a rerun of messages taken from a monitor reel associated with one of the outgoing lines, a single degree of priority normally being given to all messages in the rerun.

The procedure for sending a "string" of messages recorded on one continuous tape will be similar to that described above for sending one message, except as otherwise described.

The semi-automatic message forwarding unit 1 will be controlled in a similar manner to present its precedence marking switch 1310, the selector switch 1150 and its outgoing selector switch 1400 and also to operate relays R710–13, R710–14, R920, R1240, R1410 and R220.

When the operator is ready to depress the "read" button to start the forwarding unit 1, he may employ either one of two alternative methods for sending the messages: (1) operate the "read" button momentarily, whereby all of the messages will be transmitted without further manual control; or (2) depress the "auto reset" button to the "on" position, thereby to open contacts 207 and close contacts 208, then depress the "read" button to its "on" position to close contacts 206, and retain said buttons in their "on" positions, whereby the forwarding unit will be stopped after each message and whereby each succeeding message will be transmitted only after the "read" button is momentarily moved to its "off" position.

It will be noted that in either of the above-mentioned methods, the operator must depress the "reset" button momentarily after the last message is sent in order to return the semi-automatic message forwarding unit to normal.

The first of said two alternative methods will be described first. When the operator momentarily depresses the "read" button to momentarily close contacts 206, the start relay R1010 operates as described with respect to the transmission of a single message. The operations thereafter are the same as those previously described with respect to the transmission of a single message except where otherwise indicated.

Therefore, assuming the forwarding unit 1 has been preset and R1010 operated as previously described, start slave relay R1380 then priority relay R1350 will operate. Eventually the test relay R1030 will operate, then test guard relay R1040 will operate in series with guard relay R1450 to seize line L1 all in a manner previously described. The cutoff relay R1460 operates; test relay R1030 restores; open line relay R1110 is operated and held operated in series with the send relay R1540 and magnet M1553; the timer control relay R1596 and relay R1570 operate in series with the tape reader clutch magnet M525, the latter not operating; relay R1240 restores; R1050 operates; R1565 operates, followed by the operation of R1580, then R1561, M1533 and R1575 all in a manner previously described.

The number transmitter 1530 sends a start of message indicator and a channel sequence number, after which M1533, R1561 and R1565 restore followed by the restoration of R1575.

The clutch magnet M525 is operated and the transmitter 530 is controlled to send the message except for the end of message indicator.

The end of message relay R910 operates to restore R710–13 and R710–14 when the tape reader 520 senses an end of message indicator; the end of message character counter 1210 operates in response to succeeding characters sensed by tape reader 520 and causes R1220 to operate then R930 to operate, the latter restoring R1220 and stopping the tape reader 520 and transmitter 530 by opening the operating circuit of clutch magnet M525. R930, as previously described, also restores R1570, R1596, R1040, R1450 which restorations are followed by the restoration of R1580 and R1050.

When R1596 restores, it causes the timer 1595 to send the time of day and an end of message indicator; then the cutoff relay R1460 restores to release line L1.

When R1040 restores, it restores the priority relay R1350, open line relay R1110, and relays R910 and R920.

When R930 operates, it also causes the end of message character counter 1210 to return to normal; then R930 restores.

All of the foregoing operations are similar to those described with respect to the transmission of a single message.

However, when R930 as previously described operates relay R210, the latter does not complete the previously described circuit for operating the return to (idle) pool relay R1020 because contacts 206 are open, the "read" button having been depressed only momentarily; and, when R930 restores, R210 also restores. Thus it will be noted that the semi-automatic forwarding unit is still in the same preset condition as when the "read" button was momentarily depressed with the exception that the relays R710–13, R710–14, R920 and R1220 are not operated.

Now, it should be noted that a start of message indicator for the second message in the string will have been punched in the tape a short distance behind the end of message indicator of the first message. Referring again to the detection of said end of message indicator by tape reader 520, it will be understood that the tape reader 520 will shortly thereafter detect said second start of message indicator to reoperate R710–13 and R710–14, which relays will be maintained operated over a circuit extending from battery, through the winding of R710–13, contacts 864, the winding of R710–14 and one or more of three branches of the circuit depending upon the time, i. e., before R930 operates, one branch extending over conductor 802 to Fig. 12 to ground on the off-normal contacts 1214 of the end of message character counter 1210 holds said relays R710–13 and R710–14; a second branch extending over conductor 802 to Fig. 9 to ground on contacts 932 holds said relays operated while R930 is operated; and a third branch extending over conductor 802 to Fig. 9, over contacts 911 (R1040 and R910 restore before R930) conductor 906 to Fig. 11, and contacts 1133 to ground holds said relays operated after R930 is restored upon the restoration of the end of message character counter 1210. It will be noted with respect to said third branch that, when R930 operates, it restores R1040 which in turn restores R910 so that contacts 911 will be closed before R930 restores to open contacts 932.

After the detection of the start of message indicator, the start of message character counter 1230 is controlled (as described in said copending application of R. C. Stiles) to reoperate R1240 then R920 after predetermined numbers of characters have been counted. During the operation of said start of message counting switch, the tape reader clutch magnet M525 will be restored when R930 restores. But this condition will be momentary, since R920 will restore (shortly after R930 restores) to complete an alternate circuit for operating M525, said alternate circuit extending from ground, through the winding of M525, conductor 502–CLU by way of cable C503 to Fig. 9, contacts 921, conductor 907 to Fig. 11, contacts 1131, conductor 1103 to Fig. 11 and contacts 1012, to resistance battery. When R920 reoperates, the clutch magnet M525 restores and the second message is properly positioned with its start of message indicator just past the sensing pins of the transmitter. The semi-automatic message forwarding unit is now ready to transmit the second message when it again seizes the line L1, switches 1150, 1310 and 1400 being preset and relays R220, R710–13, R710–14, R920, R1010, R1380 and R1410 being operated.

Further operation of the forwarding unit to send the second and all additional messages in the "string" is similar to that just described with respect to the first message.

When all messages in the "string" have been sent, the operator will depress the reset key momentarily to close contacts 209 to operate the return to (idle) pool relay R1020; and the semi-automatic message forwarding unit will be restored to normal as previously described.

The second of said two alternate methods for sending a "string" of messages will now be described. This second method is the same as the first method except that, instead of merely "depressing the read button momentarily," the operator will depress the "auto reset" button to its "on" position and the "read" button to its "on" position and return said buttons to their normal "off" positions only after all messages in the "string" have been sent. Now, after each message has been sent and R210 operates as previously described, said R210 will lock itself operated over a circuit including contacts 206 of the "auto reset" button, contacts 213 and the lower winding of R210. Further it will be noted that the first described circuit for operating the return to (idle) pool relay R1020 is open at contacts 207 of the "auto reset" button and therefore R1020 will not operate. The operator must now move the "read" button to "off" momentarily after each message to release R210 and allow the forwarding unit to again call for the line L1.

Again, to release the forwarding unit after all messages have been sent, the operator will momentarily depress the reset button to close contacts 209 to initiate said release. The latter method may be used when more thorough manual control is desired.

In said previously-mentioned copending application of R. C. Stiles, a detailed description was given regarding the manner in which a cross office unit having a high priority message stored therein can stop the transmission of a message of a lower priority being sent over the same line as the high priority message is to be sent. As regards this feature, the semi-automatic message forwarding units disclosed herein are similar to the cross office units. Therefore it is felt that this feature need not be described.

While there has been described what is at present considered to be the preferred embodiment of the invention, it will be understood that various modifications may be made therein; and it is contemplated to cover in the appended claims all such modifications as fall within the true spirit and scope of the invention.

What is claimed is:

1. In a telegraph switching system having a plurality of incoming lines over which signals of telegraph messages are received, a plurality of outgoing lines over which signals of telegraph messages are transmitted; a plurality of automatic message storage units, means controlled upon the receipt of messages over said incoming lines for selecting available ones of said storage units and for routing said messages thereto, means individually associated with each of said storage units for recording and storing a message routed thereto, a destination indication associated with each message, means controlled upon the selection of a storage unit for connecting it to a predetermined one of said outgoing lines in accordance with the destination indication of the message routed thereto, means associated with each storage unit for retransmitting the message stored therein over the outgoing line to which the storage unit is connected, a precedence indication associated with each message indicative of the degree of priority of the message, means in each storage unit controlled to register the precedence of the message routed thereto, means controlled in accordance with said precedence registrations for causing a plurality of storage units having messages awaiting transmission over the same outgoing line to sequentially connect their respective retransmitting means to said outgoing line for transmitting said messages in a descending order of priority, an intercept position, means controlled upon the receipt of a message over one of said incoming lines for routing said message to the intercept position if no automatic message storage unit is available and means for recording messages routed to said intercept position, in combination therewith, a semi-automatic message forwarding unit comprising a precedence register switch, means controlled by an operator for setting said register switch to a position corresponding to a predetermined degree of priority and for connecting said forwarding unit to a predetermined outgoing line, means for transmitting a recorded message manually inserted in the unit by the operator, said sixth-mentioned means controlled to connect said last-mentioned transmitting means to the last-mentioned outgoing line for transmission of its message when no automatic storage unit has stored therein a message of a higher degree of priority awaiting transmission over said last-mentioned outgoing line, whereby messages including those routed to an intercept position may be transmitted over an outgoing line.

2. In a telegraph system having a plurality of outgoing lines over which telegraph messages are transmitted, a plurality of semi-automatic message forwarding units having access to said lines, a recording medium manually inserted in each of said units, each medium having a different message recorded therein, a precedence register switch in each unit, means controlled by the operator for setting said register switches to positions corresponding to the degrees of priority allotted to the messages stored in the respective units, means controlled upon the positioning of a register switch for connecting its respective unit to a predetermined one of said outgoing lines, means in each unit for transmitting the message inserted therein over the line to which the unit is connected, relay means in each unit for connecting the transmitting means to the outgoing line to which the unit is connected for transmission of the message thereover, a manually operable start means in each unit for conditioning the respective relay means, means for operating said conditioned relay means in said units in a predetermined sequence to sequentially control the respective transmitting means to send their messages, and means including said precedence register switches for preventing the operation of the relay means in one unit while another unit having a message of a higher degree of priority is connected to the same outgoing line.

3. For use in a telegraph system having an outgoing line over which telegraph messages are transmitted, having a plurality of message forwarding units individually associated with said line, each having a message of differing priority stored therein awaiting transmission over said line, and said system having means for controlling said forwarding units so that messages are sequentially transmitted over said line in accordance with a predetermined order of priority, a semi-automatic message forwarding unit having a message manually inserted therein and comprising a plurality of outgoing selector switches one of which has access to said line, a precedence marking switch, a plurality of manually operable marking means, means controlled by one of said marking means for selecting said one outgoing selector switch, means controlled by a second one of said marking means for setting said precedence switch to a position corresponding to a predetermined degree of priority, and means thereafter controlled by a third one of said marking means for setting said one outgoing selector switch to said outgoing line, a manually operable start means, a means for transmitting signals in accordance with the message stored in the semi-automatic unit, and means controlled by said first means for connecting the transmitting means to the outgoing line to send the message thereover when no other message of higher priority is awaiting transmission.

4. For use in a telegraph system having a plurality of outgoing lines over which telegraphic messages are transmitted and having a plurality of message forwarding units including a semi-automatic unit for sending messages over said lines, said one semi-automatic unit comprising a group of outgoing selector switches each having access to some of said outgoing lines, a precedence marking switch, a transmitting device, a first set-up switch, means for manually setting said set-up switch to a position corresponding to a predetermined one of several available message priorities, second and third set-up switches, means for manually setting said second and third set-up switches to positions corresponding respectively to a predetermined one of said outgoing selector switches and to a predetermined one of the outgoing lines available to said one selector switch, a manually operated set-up start means, means controlled by said first set-up switch upon the operation of said start means for setting the precedence marking switch to a position corresponding to the predetermined priority, means controlled by said second set-up switch upon the operation of said start means for selecting the predetermined outgoing selector switch, means thereafter controlled by said third set-up switch for setting the predetermined outgoing selector switch to the predetermined outgoing line, means thereafter operated manually to condition the forwarding unit for the transmission of a message stored in a recording medium manually inserted in its transmitting device, means operated and effective when no other message forwarding unit has a message of higher priority awaiting transmission over said predetermined outgoing line for connecting the transmitting device to the predetermined outgoing line, and means thereafter operated and effective for causing transmitting device to send its message over said predetermined outgoing line.

5. For use in a telegraph system having a plurality of lines over which signals of telegraph messages are transmitted, a plurality of semi-automatic message forwarding units, each having access to said lines; a recording medium manually inserted in each unit, a message being stored in each medium; a precedence register switch associated with each unit; means controlled by an operator for setting each register switch to a position corresponding to a predetermined degree of priority allotted to the respective unit; means controlled upon the positioning of a register switch for connecting the respective associated unit to a predetermined one of said lines; means in each unit controlled by the operator after the unit is connected to a line for further conditioning the unit; means for sequentially sending ground pulses to said units in a predetermined order; a test means in each conditioned unit operated by a ground pulse sent thereto if the line to which it has been connected is idle; a transmitting means in each unit; means controlled upon the operation of the test means in a unit for connecting its transmitting means to the connected line for transmission of its stored message over said connected line; and means including all of said register switches for preventing the operation of one of said test means if another unit having a higher degree of priority registered therein is connected to the same line as the unit having said one test means, whereby the units sequentially transmit their messages over predetermined lines and transmit messages over the same line in a predetermined order of priority.

6. The combination claimed in claim 5 together with means controlled by the operator for differently conditioning one of said units in which the operator has inserted a continuous recording medium having a plurality of messages stored therein one after the other, control information recorded with each message, and means controlled in accordance with said control information together with said fourth, fifth, sixth and eighth means for sending the messages in the differently conditioned unit, one at a time, over the line to which the unit has been connected.

7. For use in a telegraph system having a line over which signals of telegraph messages are transmitted, a plurality of semi-automatic message forwarding units, each unit having access to said line; a recording medium inserted in each unit, a plurality of messages being recorded in each medium, one message after another, with start and end of message indications respectively preceding and following each message; a precedence register switch in each unit; means controlled by an operator for setting the register switches to positions corresponding to predetermined degrees of priority allotted to the messages stored in the respective units; means controlled upon the positioning of each register switch for connecting its respective unit to said line; means in each unit for detecting the start and end of message indications; means in each unit operated to register the detection of said indications; means in each unit controlled by the operator for operating said last means thereby to simulate the detection of the start of message indicator of the first message stored therein; means in each unit controlled by the operator to start the unit after said simulation of the detection of the start of message indication; a test relay in each unit; means in each unit operated when the line is idle for conditioning the test relays in units in which said fourth means is operated, means for sequentially sending ground pulses to the units in a predetermined order, circuit means in each unit for operating the conditioned test relay in response to a ground pulse sent thereto, means in each unit for transmitting messages over said line, means controlled by the operation of a test relay for marking the line busy and for connecting its transmitting means to said line for transmission of one message thereover; means controlled upon said third and fourth means detecting and registering an end of message indication following said one message for restoring said operated test relay thereby to disconnect its respective transmitting means from the line and to remove the busy marking from the line, said third and fourth means thereafter operative to detect and register the start of message indication of the message recorded immediately after said one message, said seventh means again conditioning the test relays when the busy marking is removed from the line, another one of the test relays operated by a ground pulse sent thereto to connect its transmitting means to the line to send a message, and means including said register switches for preventing the operation of a conditioned test relay if, when a pulse is sent thereto, another unit has a message of a higher degree of priority awaiting transmission over the line, whereby said units are controlled automatically to send their messages over the line in accordance with a predetermined order of priority after an operator has completed the initial set-up operations.

8. For use with a telegraph message forwarding unit having means associated therewith whereby it can be controlled together with other message forwarding units to sequentially transmit messages over a predetermined telegraph line in accordance with a predetermined order of priority registered in precedence marking switches associated with said units, a remote control mechanism for setting the precedence register switch of said first-mentioned unit to a position corresponding to a predetermined degree of priority and for causing the unit to be connected to a predetermined line, said mechanism comprising a pair of marking switches set by an operator to positions corresponding respectively to said predetermined degree of priority and said predetermined line, a step-by-step control switch associated with each marking switch, a start means operated by the operator, means controlled upon the operation of the start means for operating one of said control switches, means dependent upon the position of the marking switch associated with said one control switch for preventing further operation of said one control switch after a predetermined number of steps, means controlled by the operation of said one control switch for stepping the register switch to a position corresponding to said predetermined degree of priority, means thereafter controlled to operate the other control switch, means dependent upon the position of the other marking switch for preventing further operation of the other control switch after a predetermined number of steps, and means controlled by the operation of the other control switch for connecting the unit to the predetermined outgoing line.

9. The mechanism claimed in claim 8 together with means controlled by the operator for further conditioning the message forwarding unit so that it can thereafter be controlled automatically by said first means to send a message over the line to which it is connected.

10. For use in a telegraph system having a plurality of message transmitting units together with means for controlling said units sequentially to transmit messages stored therein over outgoing telegraph lines and for further controlling said units to transmit a plurality of messages stored in different ones of said units over the same line in a predetermined order in accordance with the degrees of priority registered in precedence register switches associated with said different units, a remote control system for conditioning said units after which conditioning the units are controlled automatically by the first means to transmit messages stored therein, said remote control system comprising a first and second marking switches corresponding to each unit, the first marking switches set by an operator to positions corresponding to predetermined degrees of priority allotted to the messages stored in the respective units, the second marking switches set by an operator to positions corresponding to predetermined lines over which said messages are to be transmitted; a means corresponding to each unit manually operated for starting the remote control system; means operated responsive to the operation of a start means for finding and seizing the unit corresponding thereto; a first step by step control switch common to all of said first marking switches and operated upon the seizure of said corresponding unit; means for preventing further operation of said first control switch after said control switch has made a predetermined number of steps depending upon the position to which the first marking switch, corresponding to the seized unit, has been set; means controlled by said first control switch for operating the precedence register switch in the seized unit to register a predetermined degree of priority; a second control switch, common to all of said second marking switches, thereafter controlled to make a predetermined number of steps dependent upon the position to which the second marking switch, corresponding to the seized unit, has been set; means controlled by the operation of said second control switch for connecting the seized unit to a predetermined outgoing line; and means thereafter controlled for restoring said first and second control switches to normal.

11. The remote control system claimed in claim 10 together with means controlled by the operator for further conditioning a seized message transmitting unit and means also controlled by the operator for starting the conditioned unit so that it may thereafter be automatically controlled by said first means to send a message stored therein.

12. The remote control system claimed in claim 11 together with means controlled in a different manner by the operator for starting the seized message transmitting unit so that it may thereafter be controlled automatically by said first means to send a plurality of messages stored therein, one at a time over the line to which the unit is connected.

13. For use in a telegraph system having a message forwarding unit, which unit is controlled together with other units by means associated therewith to sequentially transmit messages over a predetermined outgoing line in accordance with the order of priority given to said messages, a remote control mechanism for selecting one of a plurality of outgoing selector switches available to said unit, for setting said one outgoing selector switch to said predetermined outgoing line and for setting a precedence register switch in said unit to a position corresponding to a predetermined degree of priority, said mechanism comprising a first, second and third marking switches manually set to positions corresponding respectively to said predetermined degree of priority, said one outgoing selector switch and said line, a step by step control switch for each of said marking switches, means controlled by the operator for starting said mechanism, means thereafter controlled for advancing the first and second control switches predetermined numbers of steps dependent upon the positions to which the first and second marking switches have been set, means controlled by said first control switch for advancing the precedence marking switch to a position corresponding to said predetermined degree of priority, means controlled by said second control switch for selecting said one outgoing selector switch, means controlled thereafter for advancing the third control switch a predetermined number of steps dependent upon the position of the third marking switch, means controlled by said third switch for causing the outgoing selector switch to select the outgoing line.

14. The mechanism claimed in claim 13 together with means controlled by the operator for further conditioning said unit and means also controlled by the operator for initiating the operation of said message forwarding unit.

References Cited in the file of this patent

UNITED STATES PATENTS

| | | |
|---|---|---|
| 2,193,967 | Kleinschmidt | Mar. 19, 1940 |
| 2,279,295 | Blanton | Apr. 14, 1942 |
| 2,406,787 | Bacon | Sept. 3, 1946 |
| 2,511,832 | Agbew | June 20, 1950 |